United States Patent [19]
Kanie et al.

[11] Patent Number: 5,956,755
[45] Date of Patent: Sep. 21, 1999

[54] SEQUENTIAL PERMUTATION APPARATUS FOR REARRANGING INPUT DATA

[75] Inventors: Youji Kanie, Tenri; Kazumasa Kioi, Fujiidera, both of Japan

[73] Assignee: Sharp Kabushiki Kaisha, Osaka, Japan

[21] Appl. No.: 08/834,463

[22] Filed: Apr. 11, 1997

[30] Foreign Application Priority Data

Apr. 11, 1996 [JP] Japan .................................. 8-089255
Mar. 10, 1997 [JP] Japan .................................. 9-054607

[51] Int. Cl.⁶ ............................................ G06F 12/10
[52] U.S. Cl. ....................... 711/206; 711/202; 711/149; 395/846; 395/848
[58] Field of Search ................................. 711/206, 202, 711/203, 149; 395/842, 846, 843, 844, 848; 364/242.3

[56] References Cited

U.S. PATENT DOCUMENTS

| | | | |
|---|---|---|---|
| 5,233,561 | 8/1993 | Mori et al. ............................ | 365/210 |
| 5,276,842 | 1/1994 | Sugita ................................... | 395/425 |
| 5,696,924 | 12/1997 | Robertson et al. ................... | 395/412 |
| 5,787,046 | 7/1998 | Furuyama et al. ................... | 365/230.3 |

FOREIGN PATENT DOCUMENTS

A-5137009 6/1993 Japan .
A-5207289 8/1993 Japan .

*Primary Examiner*—John W. Cabeca
*Assistant Examiner*—Pierre-Michel Bataille

[57] ABSTRACT

A switching circuit supplies a signal from a write memory selection terminal and its inverted signal to one of a first or a second selector and the other of the first or the second selector according to an output signal from a forward/backward translation selection terminal. In a forward translation process, the first and second selectors select a translated address on a translated address bus in a writing stage and select an input address on an input address bus in a reading stage. In a backward translation process, the selectors select the input address in the writing stage and select the translated address in the reading stage. Consequently, the forward translation and the backward translation are executed using the same translation table. An address translation table memory therefore stores therein only either a translation table for forward translation or a translation table for backward translation.

8 Claims, 21 Drawing Sheets

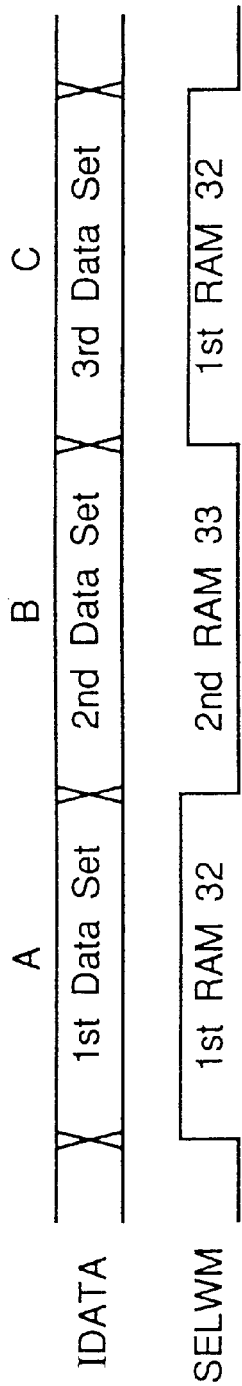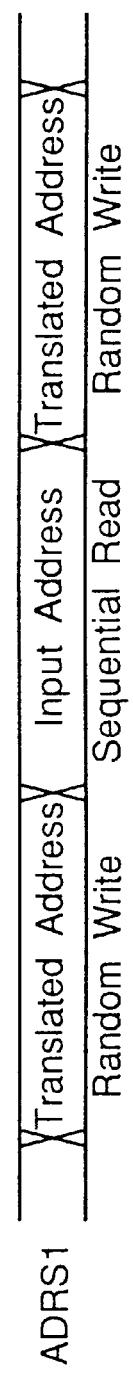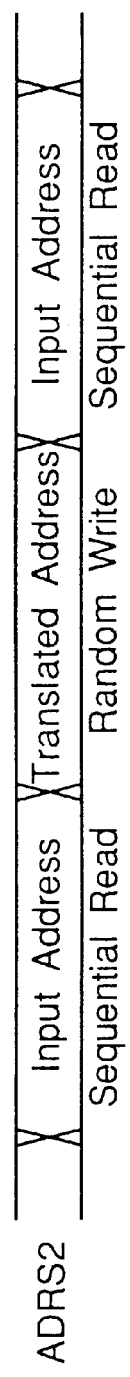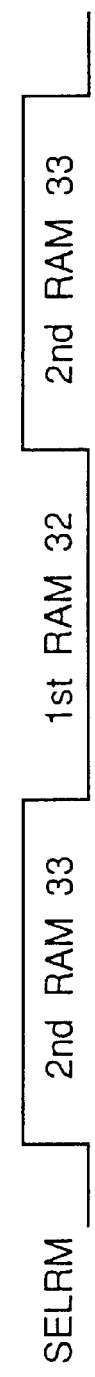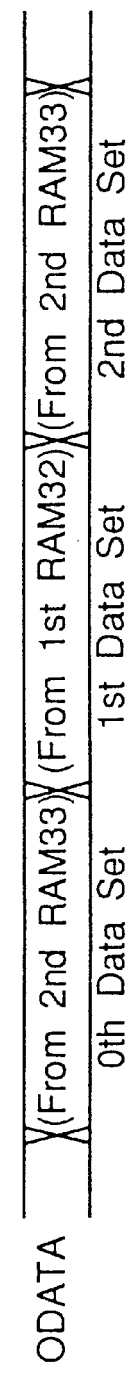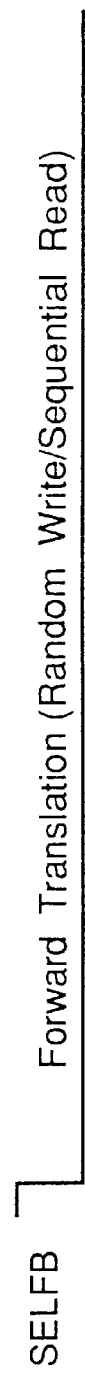

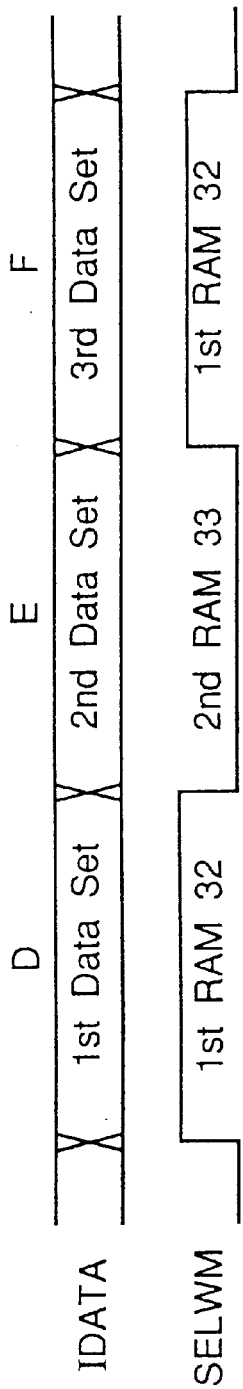

| SELTL | Translation Table 0 | Translation Table 1 |

| SELRL | 2nd Decoder 90 | 3rd Decoder 91 |

Fig.5A

Translation Rule 0
Translation Table 0
(Forward Translation)

| Order Number in Input Stage | Order Number in Output Stage |
|---|---|
| 0 | 0 |
| 1 | 2 |
| 2 | 3 |
| 3 | 9 |
| 4 | 1 |
| 5 | 4 |
| 6 | 8 |
| 7 | 10 |
| 8 | 5 |
| 9 | 7 |
| 10 | 11 |
| 11 | 14 |
| 12 | 6 |
| 13 | 12 |
| 14 | 13 |
| 15 | 15 |

Fig.5B

Translation Rule 1
Translation Table 1
(Forward Translation)

| Order Number in Input Stage | Order Number in Output Stage |
|---|---|
| 0 | 0 |
| 1 | 4 |
| 2 | 1 |
| 3 | 5 |
| 4 | 2 |
| 5 | 6 |
| 6 | 3 |
| 7 | 7 |
| 8 | 8 |
| 9 | 12 |
| 10 | 9 |
| 11 | 13 |
| 12 | 10 |
| 13 | 14 |
| 14 | 11 |
| 15 | 15 |

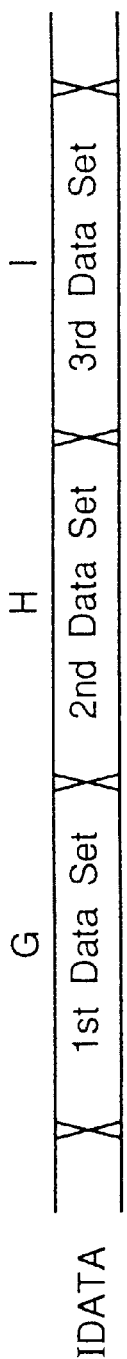
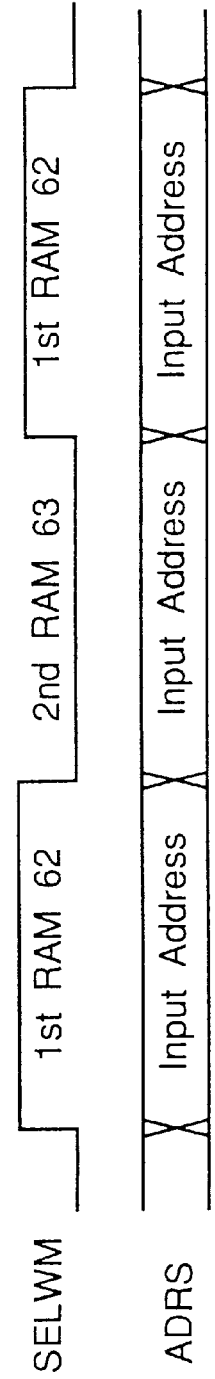
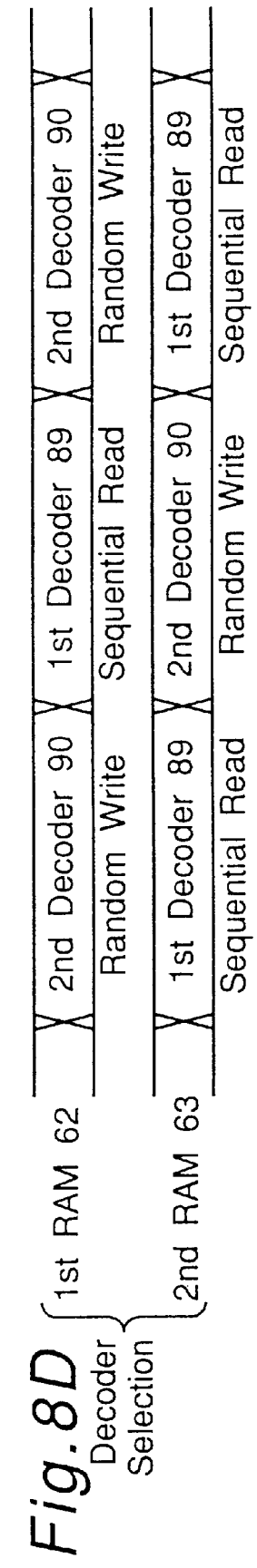
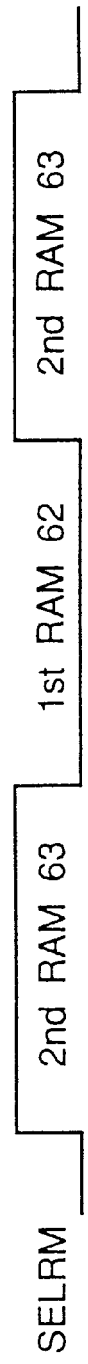
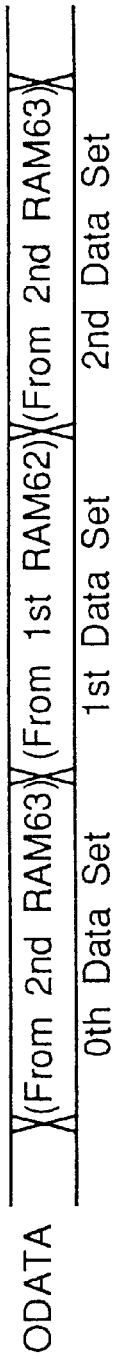

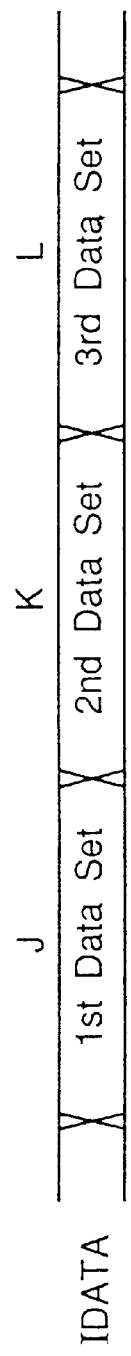
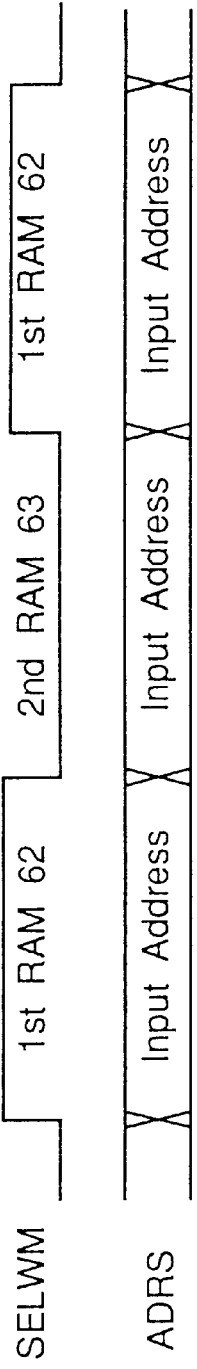
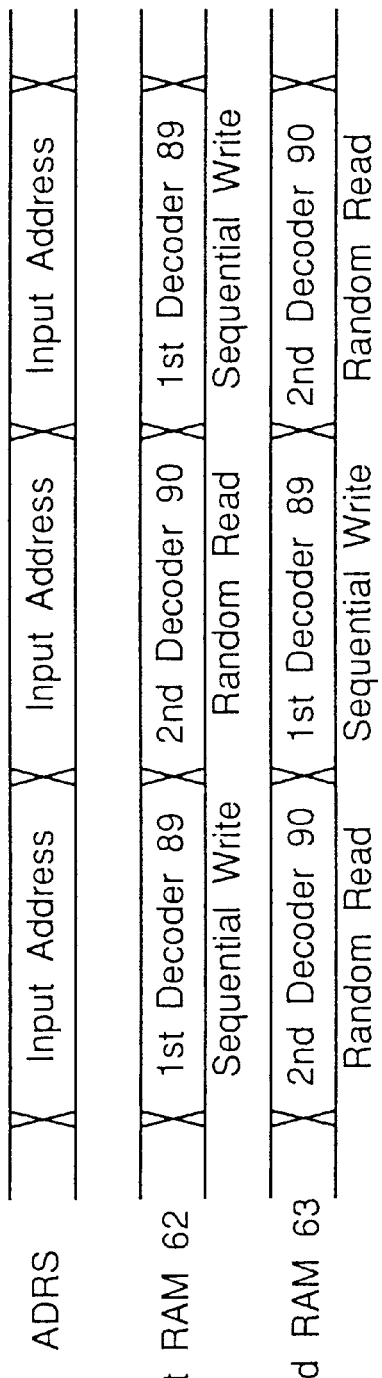
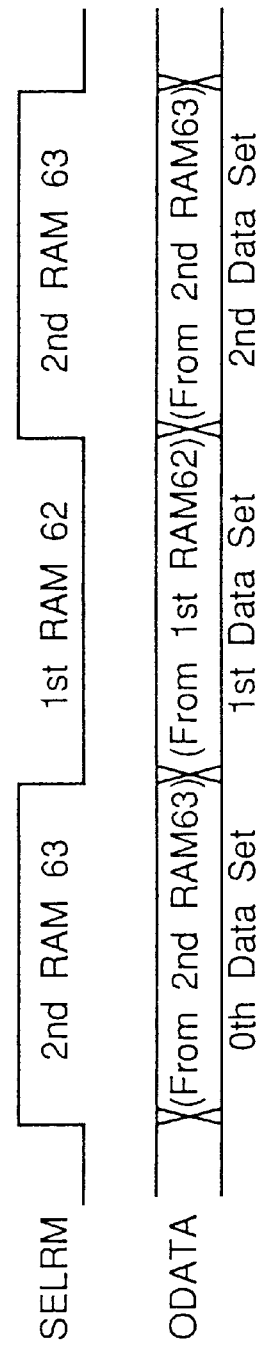

Fig.11

Translation Rule 0

| Order Number in Input Stage | Order Number in Output Stage |
|---|---|
| 0 | 0 |
| 1 | 2 |
| 2 | 3 |
| 3 | 9 |
| 4 | 10 |
| 5 | 20 |
| 6 | 21 |
| 7 | 35 |
| 8 | 1 |
| 9 | 4 |
| 10 | 8 |
| 11 | 11 |
| 12 | 19 |
| 13 | 22 |
| 14 | 34 |
| 15 | 36 |
| 16 | 5 |
| 17 | 7 |
| 18 | 12 |
| 19 | 18 |
| 20 | 23 |
| 21 | 33 |
| 22 | 37 |
| 23 | 48 |
| 24 | 6 |
| 25 | 13 |
| 26 | 17 |
| 27 | 24 |
| 28 | 32 |
| 29 | 38 |
| 30 | 47 |
| 31 | 49 |
| 32 | 14 |
| 33 | 16 |
| 34 | 25 |
| 35 | 31 |
| 36 | 39 |
| 37 | 46 |
| 38 | 50 |
| 39 | 57 |
| 40 | 15 |
| 41 | 26 |
| 42 | 30 |
| 43 | 40 |
| 44 | 45 |
| 45 | 51 |
| 46 | 56 |
| 47 | 58 |
| 48 | 27 |
| 49 | 29 |
| 50 | 41 |
| 51 | 44 |
| 52 | 52 |
| 53 | 55 |
| 54 | 59 |
| 55 | 62 |
| 56 | 28 |
| 57 | 42 |
| 58 | 43 |
| 59 | 53 |
| 60 | 54 |
| 61 | 60 |
| 62 | 61 |
| 63 | 63 |

Fig.12

Translation Rule 1

| Order Number in Input Stage | Order Number in Output Stage |
|---|---|
| 0 | 0 |
| 1 | 4 |
| 2 | 10 |
| 3 | 12 |
| 4 | 1 |
| 5 | 5 |
| 6 | 11 |
| 7 | 13 |
| 8 | 2 |
| 9 | 8 |
| 10 | 14 |
| 11 | 26 |
| 12 | 3 |
| 13 | 9 |
| 14 | 15 |
| 15 | 27 |
| 16 | 6 |
| 17 | 16 |
| 18 | 24 |
| 19 | 28 |
| 20 | 7 |
| 21 | 17 |
| 22 | 25 |
| 23 | 29 |
| 24 | 18 |
| 25 | 22 |
| 26 | 30 |
| 27 | 42 |
| 28 | 19 |
| 29 | 23 |
| 30 | 31 |
| 31 | 43 |
| 32 | 20 |
| 33 | 32 |
| 34 | 40 |
| 35 | 44 |
| 36 | 21 |
| 37 | 33 |
| 38 | 41 |
| 39 | 45 |
| 40 | 34 |
| 41 | 38 |
| 42 | 46 |
| 43 | 56 |
| 44 | 35 |
| 45 | 39 |
| 46 | 47 |
| 47 | 57 |
| 48 | 36 |
| 49 | 48 |
| 50 | 54 |
| 51 | 58 |
| 52 | 37 |
| 53 | 49 |
| 54 | 55 |
| 55 | 59 |
| 56 | 50 |
| 57 | 52 |
| 58 | 60 |
| 59 | 62 |
| 60 | 51 |
| 61 | 53 |
| 62 | 61 |
| 63 | 63 |

1st Set : Translation Rule 0
2nd Set : Translation Rule 0

1st Set : Translation Rule 0
2nd Set : Translation Rule 1

1st Set : Translation Rule 1
2nd Set : Translation Rule 0

1st Set : Translation Rule 1
2nd Set : Translation Rule 1

Fig. 19A (PRIOR ART)
Translation Rule 0
Translation Table 0-0
(Forward Translation)

| Order Number in Input Stage | Order Number in Output Stage |
|---|---|
| 0 | 0 |
| 1 | 2 |
| 2 | 3 |
| 3 | 9 |
| 4 | 1 |
| 5 | 4 |
| 6 | 8 |
| 7 | 10 |
| 8 | 5 |
| 9 | 7 |
| 10 | 11 |
| 11 | 14 |
| 12 | 6 |
| 13 | 12 |
| 14 | 13 |
| 15 | 15 |

Fig. 19B (PRIOR ART)
Translation Rule 0
Translation Table 0-1
(Backward Translation)

| Order Number in Input Stage | Order Number in Output Stage |
|---|---|
| 0 | 0 |
| 1 | 4 |
| 2 | 1 |
| 3 | 2 |
| 4 | 5 |
| 5 | 8 |
| 6 | 12 |
| 7 | 9 |
| 8 | 6 |
| 9 | 3 |
| 10 | 7 |
| 11 | 10 |
| 12 | 13 |
| 13 | 14 |
| 14 | 11 |
| 15 | 15 |

Fig. 19C (PRIOR ART)
Translation Rule 1
Translation Table 1-0
(Forward Translation)

| Order Number in Input Stage | Order Number in Output Stage |
|---|---|
| 0 | 0 |
| 1 | 4 |
| 2 | 1 |
| 3 | 5 |
| 4 | 2 |
| 5 | 6 |
| 6 | 3 |
| 7 | 7 |
| 8 | 8 |
| 9 | 12 |
| 10 | 9 |
| 11 | 13 |
| 12 | 10 |
| 13 | 14 |
| 14 | 11 |
| 15 | 15 |

Fig. 19D (PRIOR ART)
Translation Rule 1
Translation Table 1-1
(Backward Translation)

| Order Number in Input Stage | Order Number in Output Stage |
|---|---|
| 0 | 0 |
| 1 | 2 |
| 2 | 4 |
| 3 | 6 |
| 4 | 1 |
| 5 | 3 |
| 6 | 5 |
| 7 | 7 |
| 8 | 8 |
| 9 | 10 |
| 10 | 12 |
| 11 | 14 |
| 12 | 9 |
| 13 | 11 |
| 14 | 13 |
| 15 | 15 |

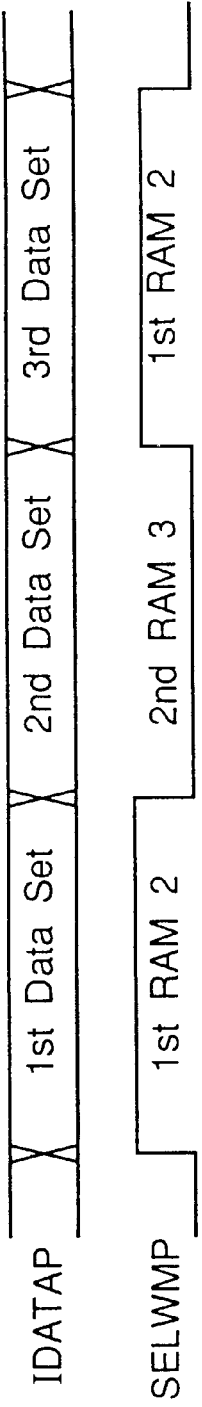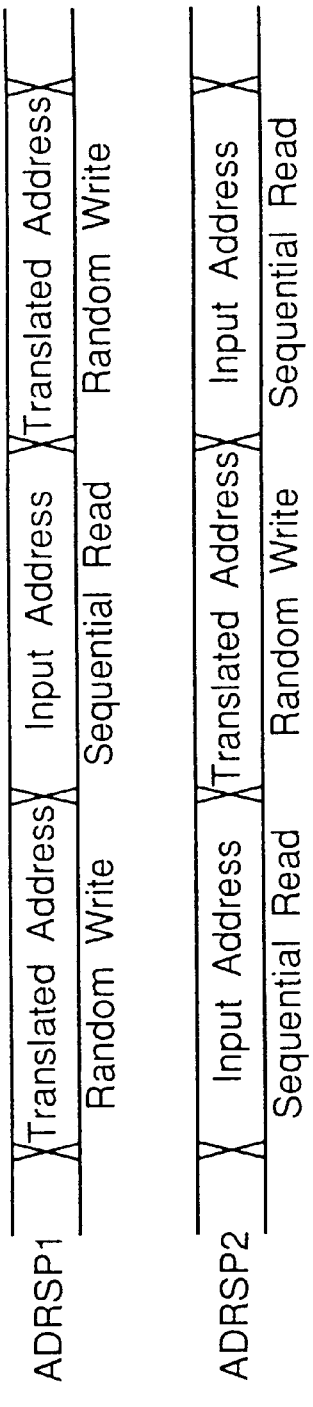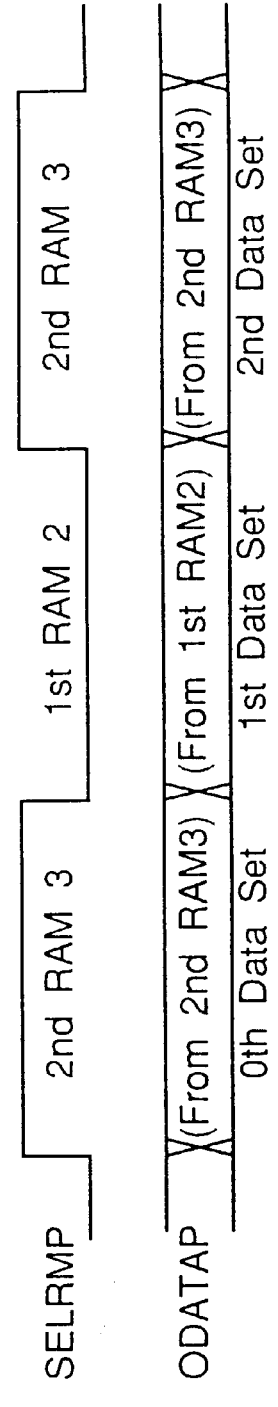
Fig. 21A (PRIOR ART)
Fig. 21B (PRIOR ART)
Fig. 21C (PRIOR ART)
Fig. 21D (PRIOR ART)
Fig. 21E (PRIOR ART)
Fig. 21F (PRIOR ART)

SEQUENTIAL PERMUTATION APPARATUS FOR REARRANGING INPUT DATA

BACKGROUND OF THE INVENTION

The present invention relates to a sequential type permutation apparatus which rearranges input data according to a specified rule to output the rearranged data in a digital integrated circuit.

A sequential type permutation apparatus is required in the stage of encoding or decoding digital VTR signals or in a similar case to sequentially change and restore the order of arrangement of a signal string according to a specified rule.

FIGS. 19A, 19B, 19C and 19D are charts showing examples of translation rules applied to a prior art sequential type permutation apparatus. These translation rules are for permutation of sixteen pieces of data grouped in one set, and according to the rules, the order of the successively inputted 16 pieces of data are changed before the data are outputted.

In this case, one piece of data is assumed to be, for example, an 8-bit binary number. Further, the above translation rules include two types 0 and 1, and switching of the translation rules is executed in response to an external designation. The order of the pieces of data inputted sequentially to the apparatus is changed (forward translation) according to the translation rule and then outputted. Further, the data the order of which has been changed according to the above translation rule, are restored to the original order (backward translation).

FIG. 18 shows a concrete circuit diagram of the aforementioned prior art sequential type permutation apparatus. This sequential type permutation apparatus has a first RAM (Random Access Memory) 2 and a second RAM 3 for temporary storage of data received from a data input terminal 1. Sequentially inputted pieces of data are written to the first RAM 2 or the second RAM 3 at respective locations according to the translation rule, and thereafter those pieces of data are sequentially read out from the piece of data written at the location having address 0. Thus, the resulting data, the order of which has been changed are outputted from a data output terminal 4.

That is, in the sequential type permutation apparatus, random access conforming to the translation rule is executed in the stage of writing to the RAMs 2 and 3, and a sequential access (access in the increasing order from the address 0) is executed in the stage of reading from the RAMs 2 and 3.

It is to be noted that the same result can be obtained by executing a sequential access in the stage of writing into the RAMs 2 and 3 and executing a random access conforming to the translation rule in the stage of reading from the RAMs 2 and 3.

An address translation table memory 5 is composed of a read only memory in which are written four types of translation tables 0-0, 0-1, 1-0 and 1-1 formed by tabulating the translation rules 0 and 1 shown in FIGS. 19A and 19B and FIGS. 19C and 19D. In each translation table are listed the "order numbers in the input stage" and the "order numbers in the output stage" which are paired with each other. When an input address equal to an "order number in the input stage" is given from an address input terminal 18 to an input address bus 12, the corresponding "order number in the output stage" is outputted to a translated address bus 9.

The translation table 0-0 reflects the translation rule 0 for forward translation. The translation table 0-1 reflects the translation rule 0 for backward translation. The translation table 1-0 reflects the translation rule 1 for forward translation. The translation table 1-1 reflects the translation rule 1 for backward translation. In either case of the translation tables, the "order number in the output stage" (i.e., translated address associated with the input address) is given as a write address via the translated address bus 9 to the RAM 2 or 3 into which data are about to be written. At the same time, the input address is given as a read address via the input address bus 12 to the RAM 3 or 2 from which data are about to be read.

Then, a translation table of the address translation table memory 5 is designated by an output signal SELTLP from a table selection input terminal 19 and an output signal SELFBP from a forward/backward translation selection terminal 20. Specifically, as shown in FIG. 20A, the translation rule 0 is designated when the output signal SELTLP of the table selection input terminal 19 has a logical level of "0", and the translation rule 1 is designated when the output signal SELTLP has a logical level of "1". Further, as shown in FIG. 20B, the forward translation is designated when the output signal SELFBP of the forward/backward translation selection terminal 20 has a logical level of "0", and the backward translation is designated when the output signal SELFBP has a logical level of "1".

Therefore, when a combination (x, y) of the logical level x of the output signal SELTLP of the table selection input terminal 19 and the logical level y of the output signal SELFBP of the forward/backward translation selection terminal 20 is (0, 0), the translation table 0-0 is designated. Similarly, the translation table 0-1 is designated in the case of (0, 1), the translation table 1-0 is designated in the case of (1, 0) and the translation table 1-1 is designated in the case of (1, 1).

Such a plurality of required translation rules are each stored in a table form in the address translation table memory 5 and the required translation table is read from the address translation table memory 5 every time of translation, for it is desired to execute the translation according to a varied translation rule depending on the type of the data.

When the logical level of a signal SELWMP from a write memory selection terminal 7 is "1" (i.e., when the first RAM 2 is selected for data writing and the second RAM 3 is selected for data reading), a first selector 8 selects the signal on the translated address bus 9 and outputs it to a first node 10 as a signal ADRSP1. On the other hand, a second selector 11 selects the signal on the input address bus 12 and outputs it to a second node 13 as an address ADRSP2. In contrast to this, when the logical level of the signal SELWMP from the write memory selection terminal 7 is "0" (i.e., when the second RAM 3 is selected for data writing and the first RAM 2 is selected for data reading), the first selector 8 selects the signal on the input address bus 12 and outputs it to the first node 10 as the signal ADRS1. On the other hand, the second selector 11 selects the signal on the translated address bus 9 and outputs it to the second node 13 as the signal ADRS2.

When an output signal SELRMP from a read memory selection terminal 14 has a logical level of "1" (i.e., when the second RAM 3 is selected for data reading and the first RAM 2 is selected for data writing), a third selector 15 connects a fourth node 17 to the data output terminal 4. In contrast to this, when the output signal SELRMP has a logical level of "0" (i.e., when the first RAM 2 is selected for data reading and the second RAM 3 is selected for datA writing), a third selector 15 connects a third node 16 to the data output terminal 4.

The permutation of the input data executed by the sequential type permutation apparatus shown in FIG. 18 will be described below with reference to FIGS. 21A through 21F showing signal change.

The RAMs 2 and 3 can each store therein sixteen pieces of data. Data are input in sets each of sixteen pieces from the data input terminal 1 in synchronization with a clock supplied from a clock input terminal 6.

First, when the logical level of the signal SELWMP from the write memory selection terminal 7 becomes "1", the sixteen pieces of data of a first set (IDATAP) from the data input terminal 1 are written into the first RAM 2. Subsequently, the logical levels of the signals SELWMP and SELRMP from the write memory selection terminal 7 and the read memory selection terminal 14 become "0". Then, the sixteen pieces of data of a second set (IDATAP) supplied from the data input terminal 1 are written into the second RAM 3. Meanwhile, the sixteen pieces of data of the first set are successively read from the first RAM 2 and transmitted to the data output terminal 4 as signal ODATAP. Subsequently, the logical levels of the signals SELWMP and SELRMP from the write memory selection terminal 7 and the read memory selection terminal 14 become "1". Then, the sixteen pieces of data of a third set (IDATAP) from the data input terminal 1 are written into the first RAM 2. In the meantime, the sixteen pieces of data of the second set are successively read from the second RAM 3 and transmitted to the data output terminal 4 as signal ODATAP.

The above operations are repeated subsequently.

Consequently, as shown in FIGS. 21A through 21F, random data write and sequential data read are alternately executed on the first RAM 2. Further, sequential data read and random data write are alternately executed on the second RAM 3 inversely in phase to the first RAM 2. Further, the data read from the second RAM 3 and the data read from the first RAM 2 are alternately outputted to the data output terminal 4.

As described above, in the prior art sequential type permutation apparatus, the translation table to be used is designated based on the output signal SELTLP of the table selection input terminal 19 and the output signal SELFBP of the forward/backward translation selection terminal 20, and address values "0" through "15" are sequentially inputted from the address input terminal 18 into the apparatus. Consequently, the address signal representative of a value same as the "order number in the input stage" in the designated translation table is supplied to the input address bus 12 sequentially from "0", while the corresponding "order number in the output stage" in the designated translation table is outputted to the translated address bus 9.

Then, according to the signal SELWMP from the write memory selection terminal 7, the selector 8 or 11 corresponding to the RAM 2 or 3 for writing transmits the "order number in the output stage" on the translated address bus 9 as the write address to the RAM 2 or 3. On the other hand, the selector 11 or 8 corresponding to the RAM 3 or 2 for reading transmits the input address on the input address bus 12 as the read address to the RAM 3 or 2.

FIG. 22 is a diagram showing a part of the internal construction of the RAM 2 (RAM 3 has the same internal construction although not illustrated). In each RAM 2, 3, the input address (read address) signal or the translated address (write address) signal transmitted from the selector 8, 11 to an address bus 21 is decoded by a decoder 22. Then, according to the decoding result, one of word lines 23 is activated. Then, data are written into or read from the activated word with the aid of bit lines 24, . . . , 24.

In the sequential type permutation apparatus shown in FIG. 18, sets of 16 pieces of data, each piece of data consisting of 8 bits, are written into or read from the first and second RAMs 2 and 3 set by set, and therefore, the RAMs 2 and 3 are each comprised of sixteen words in which the 8-bit data are stored. Accordingly, there are sixteen word lines 23 and eight bit lines 24. Furthermore, since it is required to individually designate the sixteen words in each RAM 2 and 3, the address bus 21 is required to have signal lines corresponding to four bits.

The data thus read from the RAM 2 or 3 are outputted to the data output terminal 4 connected by the third selector 15 in response to the signal SELRMP from the read memory selection terminal 14.

It is known that depending on the characteristics of the translation rule, the first RAM 2 and the second RAM 3 shown in FIG. 18 can be constructed of a single RAM by means of a dual port memory which has a first port and a second port and has a storage capacity corresponding to the data of one set, as disclosed in Japanese Patent Laid-Open Publication No. HEI 5-207289.

FIG. 23 shows a diagram of the construction of a dual port memory disclosed in the Japanese Patent Laid-Open Publication No. HEI 5-207289.

In this dual port memory 25, input data at a first port 26a is written according to a write address inputted to a write address input terminal 27. Then, the written data are read through a second port 26b according to a read address inputted to a read address input terminal 28. In this case, the read address is generated by a read address generator 30 based on a write address signal delayed by a specified time in a delay section 29.

Next, the case where the dual port memory 25 shown in FIG. 23 is applied to the sequential type permutation apparatus shown in FIG. 18 will be discussed below.

A sequential type permutation apparatus using the dual port memory 25 may be achieved by employing the following arrangement. That is, input data at the data input terminal 1 shown in FIG. 18 is inputted to the first port 26a of the dual port memory 25, while an input address signal at the address input terminal 18 is inputted to the write address input terminal 27. Further, the input address signal is delayed and then given to the address translation table memory 5, and the outputted translated address is supplied to the read address input terminal 28 of the dual port memory 25. Then, the data read from the second port 26b of the dual port memory 25 is transmitted to the data output terminal 4.

Therefore, this sequential type permutation apparatus has a sequential write and random read function, which is converse to the random write and sequential read function of the sequential type permutation apparatus shown in FIG. 18, although the order of the data outputted after the permutation is identical.

FIG. 24 shows the transitions of the read address for a first set of data, the write address for a second set of data, and the read address for the second set of data in the case where the permutation is executed with the translation table 0-0 shown in FIG. 19A by means of the sequential type permutation apparatus employing the dual port memory 25.

As is apparent from FIG. 24, in the case of the permutation based on the translation table 0-0 by means of the dual port memory 25, the data written in the dual port memory 25 can be read without being destroyed when the aforementioned delay is of seven to nine clocks. FIG. 24 shows the case where the delay corresponds to eight clocks.

The above-described various prior art sequential type permutation apparatuses have the following problems.

Problems of the first sequential type permutation apparatus having two RAMs shown in FIG. 18 will be described first.

(1) The translation tables are used exclusively for the forward translation and the backward translation, respectively. That is, for a single translation rule, two translation tables are required to be stored in the address translation table memory 5. Therefore, when there are two types of translation rules of the translation rule 0 and the translation rule 1, it is necessary to store four (two by two) translation tables.

Meanwhile, the forward translation and the backward translation are performed only by reading the same translation rule in opposite directions to each other. Therefore, it may be sufficient to store either the forward translation table or the backward translation table. In other words, in the prior art sequential type permutation apparatus, the address translation table memory 5 stores even basically unnecessary translation tables, so that its storage capacity becomes larger than is necessary.

(2) Each of the two selectors 8 and 11 selects either the "order number in the output stage (write address)" on the translated address bus 9 or the input address (read address) on the input address bus 12 according to the signal from the write memory selection terminal 7. Therefore, it is necessary to wire two address buses of the translated address bus 9 and the input address bus 12 up to the two selectors 8 and 11.

In general, the bus in an integrated circuit has a long wiring length and needs a large layout area, and this results in an increased load capacity. Therefore, a great power is required for transmitting a signal via the long bus. Accordingly, it is preferable to make the bus length as short as possible. In the case of the prior art apparatus, each of the RAMs 2 and 3 requires only either of the write address from the translated address bus 9 and the read address from the input address bus 12 in the writing stage and the reading stage. Furthermore, as described above, the write address (order number in the output stage) and the read address (input address) correspond to each other on a one-to-one basis on the translation table. Therefore, the write address may be derived from the read address, and it may be sufficient to form only the input address bus 12. In other words, due to the formation of the basically unnecessary translated address bus 9, the prior art sequential type permutation apparatus needs a bus length longer than necessary, a circuit area larger than necessary, power consumption greater than necessary.

In the case of the sequential type permutation apparatus using the dual port memory 25 of FIG. 23 having a capacity corresponding to one set of data in place of the two RAMs 2 and 3 of the sequential type permutation apparatus of FIG. 18 to attempt to reduce the data storage capacity, the following problem occurs.

When considering the case where an output is made by merely changing the order of the input data of one set, it is sufficient to provide a dual port memory 25 having a capacity corresponding to one set of data as disclosed in Japanese Patent Laid-Open Publication No. HEI 5-207289 and start the read before the write of one set of data into the dual port memory 25 is completed.

As well known, in recent years, the digital techniques of electronic equipment have progressed, and among others, a band compression technique intended for coding image data at a low bit rate for transmission and recording has made a remarkable progress. As the band compression technique, there has been developed a variety of systems such as a predictive coding system and an orthogonal coding system (refer to "Multi-dimensional Processing of TV image", T. Fukinuki, published by NIKKAN KOGYO SHIMBUN, LTD, Japan).

Currently, the technique of band-compressing digital image processing data has been standardized. According to the standardization, one set of quantization coefficients arranged raster-sequentially is permutated or rearranged in a zigzag order, and a quantizing process is executed based on the quantization coefficients that have undergone the permutation.

The quantizing process is a sort of information omitting, or rounding off process, and to efficiently perform the quantizing process, it is necessary to determine a maximum value among the input data in one set. Therefore, the quantizing process cannot be executed unless the maximum value of the input data in one set has been determined when the rearranged, or permutated data are outputted from the sequential type permutation apparatus.

The above fact is not limited to the case where the quantization follows a processing performed by the sequential type permutation apparatus, and then, information required to be obtained from the input data in one set is not necessarily a maximum value. In general, there are also cases where, according to the subsequent processing, a minimum value among the input data in one set must be determined or a total of the input data in one set must be obtained. In such cases also, the necessary information of input data in one set is required to have been already obtained when the data having undergone the permutation are outputted from the sequential type permutation apparatus.

That is, the data reading from the sequential type permutation apparatus must be started at least after all the data in one set have been written into the memory.

Therefore, in the sequential type permutation apparatus which employs the dual port memory 25 shown in FIG. 23 in place of the two RAMs 2 and 3 of the sequential type permutation apparatus shown in FIG. 18, when the reading of one set of data is started before the completion of the writing of the one set of data into the dual port memory 25, the read data must be stored in another memory until necessary information such as a maximum or minimum value has been obtained from the one set of input data such that the next processing will be able to start. This, however, cancels the effect of using the dual port memory 25 to reduce the memory capacity of the sequential type permutation apparatus of FIG. 18.

So long as the above restriction is placed on the timing of reading data from the dual port memory 25 of the sequential type permutation apparatus, the mere replacement of the two RAMs 2 and 3 of the sequential type permutation apparatus shown in FIG. 18 with the dual port memory 25 of FIG. 23 having a capacity corresponding to one set of data will not able to realize a sequential type permutation apparatus with a dual port memory which is capable of dealing with a plurality of translation rules even considering the subsequent process.

SUMMARY OF THE INVENTION

An object of the present invention is therefore to provide a sequential type permutation apparatus in which an address translation table memory has a reduced storage capacity.

Another object of the present invention is to provide a sequential type permutation apparatus having a small circuit area and a reduced power consumption.

A further object of the present invention is to provide a sequential type permutation apparatus employing a dual port memory which has a small storage capacity, which is capable of dealing with a plurality of different translation rules, and which can not only read a set of data after completing writing of the data but also concurrently perform the next writing operation and the reading operation independently of each other.

In order to achieve the aforementioned object, according to a first aspect of the present invention, there is provided a sequential type permutation apparatus comprising:

an address translation table memory which stores therein a translation table for obtaining a translated address from an input address and which operates, upon receiving an input address signal from an address input terminal, to output a translated address signal corresponding to the input address signal;

a random access memory into which data are to be written;

a mode selecting means which selects either a first mode or a second mode based on a mode selection signal received from a mode selection terminal to output an address selection control signal corresponding to the selected mode; and an address selecting means to which the input address signal and the translated address signal are supplied, wherein said address selecting means alternately provides the input address signal and the translated address signal as a write address signal and a read address signal, respectively, to the random access memory when receiving the address selection control signal corresponding to the first mode from the mode selecting means, and alternately provides the translated address signal and the input address signal as the write address signal and the read address signal, respectively, to the random access memory when receiving the address selection control signal corresponding to the second mode.

With the above construction, when the first mode is selected, data writing to and data reading from the random access memory are alternated using the input address signal as a write address signal and the translated address signal as a read address signal, respectively. That is, a forward translation is executed.

On the other hand, when the second mode is selected, data write to and data read from the random access memory are alternated using the translated address signal as a write address signal and the input address signal as a read address signal, respectively. That is, in the second mode, a backward translation relative to the translation in the first mode is executed.

Thus, according to the present invention, the forward translation and the backward translation can be executed by the same translation table on which the input address is associated with the translated address. Accordingly, in contrast to the prior art, there is no need for storing translation tables exclusively for the backward translation in the address translation table memory, so that the storage capacity of the address translation table memory can be reduced by half, as compared with the prior art. As a result, the arrangement is advantageous when the apparatus is mounted to portable equipment.

According to a second aspect of the present invention, there is provided a sequential type permutation apparatus comprising:

a random access memory into which data are to be written;

a plurality of decoders each of which operates, upon receiving an input address signal, to decode the input address signal according to a rule which is different from rules for the other decoders, to activate a word line of the random access memory; and a decoder selection circuit which selects one of the plurality of decoders based on an address selection control signal and supplies the input address signal received from an address input terminal to the selected decoder.

In the apparatus with the above construction, by the decoder selected by the decoder selection circuit, the input address signal is decoded by a rule different from those of the other decoders, so that the corresponding word line of the random access memory is activated. Thus, the data writing/reading is executed on the corresponding word in the random access memory in conformity to the decoding rule of the selected decoder, so that the address translation is executed without using the address translation table memory.

This sequential type permutation apparatus requires neither the address translation table memory, which is used in the apparatus according to the first aspect of the present invention, nor a translated address bus for supplying the translated address signal from the address translation table memory to the random access memory, thereby achieving the reduction of the circuit area and the reduction of the consumption power by an amount for driving the translated address bus.

In an embodiment, the above apparatus further comprises a mode selecting means which selects either a first mode or a second mode according to a mode selection signal inputted from a mode selection terminal to output the address selection control signal according to the selected mode. Further, when receiving the address selection control signal conforming to the first mode from the mode selecting means, the decoder selection circuit supplies the input address signal to a specified decoder among the plurality of decoders in a writing stage and to one of the decoders other than the specified decoder in a reading stage, and when receiving the address selection control signal conforming to the second mode, the decoder selection circuit supplies the input address signal to the one decoder in the writing stage and to the specified decoder in the reading stage. The rule used by the specified decoder in a decoding stage is a rule for decoding the input address signal as it is, and a rule used by the one decoder in the decoding stage is a decoding rule for executing the decoding according to a translated address signal associated with the input address signal.

According to the above construction, when the first mode is selected, the random access memory is alternately subjected to the writing using the input address signal and the reading using the translated address signal. That is, the forward translation is executed.

In contrast to the above, when the second mode is selected, the random access memory is alternately subjected to the writing according to the translated address signal and the reading according to the input address signal. That is, in the second mode, the backward translation relative to the translation in the first mode is executed.

Thus, the forward/backward translation is executed using neither the address translation table memory nor the translated address bus.

The rules used by the respective decoders other than the specified decoder in the decoding stage may be rules for executing the decoding according to mutually different translated address signals each associated with the input address signal, and the decoder selection circuit may be provided with a decoder selecting means for selecting the one decoder based on a selection signal from a translation rule selection terminal to supply the input address signal thereto.

In this case, according to the selection signal coming from the translation rule selection terminal, the forward/backward translation conforming to the various translated addresses (i.e., translation rules) associated with the input address may be executed.

A third aspect of the present invention provides a sequential type permutation apparatus comprising:

an address generating means which generates an input address signal;

an address translation table memory which stores therein a translation table used for obtaining a translated address from the input address and which operates, upon receiving the input address signal, to output a translated address signal corresponding to the input address signal;

a dual port memory which has a write port and a read port and into which data are to be written; and an address selecting means to which the input address signal and the translated address signal are supplied, wherein said address selecting means provides the dual port memory with the input address signal and the translated address as a write address signal and a read address signal, respectively, when receiving an address selection control signal representing a first mode from a mode selection terminal, and provides the dual port memory with the translated address signal and the input address signal as the write address signal and the read address signal, respectively, when receiving the address selection control signal representing a second mode from the mode selection terminal.

In the apparatus with the above construction, when the address selecting means receives the address selection control signal representing the first mode, the dual port memory is subjected to the writing according to the input address signal and the reading according to the translated address signal. That is, the forward translation is executed.

In contrast to the above, when the address selection control signal representing the second mode is received, the dual port memory is subjected to the writing according to the translated address signal and the reading according to the input address signal. That is, in the second mode, a backward translation in reverse to the translation in the first mode is executed.

Thus, when executing the permutation by means of a single dual port memory, the forward and backward translations are executed by the same translation table.

The present apparatus is not required to store translation tables exclusively for the backward translation in the address translation table memory, and only the single dual port memory is required as a write memory, and this provides a further advantage to the apparatus when being mounted to portable equipment.

In an embodiment, N-piece data sets are successively inputted to the write port of the dual port memory. And, if an input order and an output order for the N-piece data in one set are i and fi, respectively, and a maximum value of |fi−i| with respect to all translation rules is Dmax, then the dual port memory has a storage capacity of (N+Dmax) pieces of data or more.

In this embodiment, the storage capacity of the dual port memory is made larger by the Dmax or more pieces of data than the storage capacity of a set of N pieces of data. Due to this increased storage capacity, the apparatus can not only read a set of data after completing writing of the data but also concurrently execute the next writing operation and the reading operation independently of each other when executing the data permutation by means of the dual port memory. Furthermore, when this arrangement is adopted, the storage capacity of the dual port memory is minimized. Furthermore, because Dmax is the maximum value of |fi−i| for all the translation rules, a plurality of different translation rules can be dealt with, and when the dual port memory has a storage capacity of (N+Dmax) pieces of data, it has the minimum storage capacity for all the translation rules.

The apparatus may further comprise an address setting means that sets a next write address and a next read address but one for the dual port memory based on an address signal for designating an address next to a last address in a preceding writing area of the dual port memory and the write address signal and read address signal received from the address selecting means.

With this construction, based on the address signal designating an address next to the last address in the preceding writing area of the dual port memory as well as the write address signal and the read address signal received from the address selecting means, setting of an actual write address and read address on the dual port memory is executed by the address setting means. Thus, after completing the writing of one set of data, the reading of the data is executed on the dual port memory, and the reading is executed concurrently with but independently of the next writing.

Alternatively, 2m-piece data sets may be successively inputted to the write port of the dual port memory. And, if an input order and an output order for the 2m-piece data in one set are i and fi, respectively, a maximum value of |fi−i| with respect to all translation rules is Dmax, and m≧Dmax, then the dual port memory has a storage capacity of 3m pieces of data.

Further, the dual port memory may be segmented into three writing areas each having a storage capacity of m pieces of data. Then, the apparatus may have an address setting means which sets a next write address and a next read address but one for the dual port memory based on an area designation signal for designating a next writing area of the dual port memory and the write address signal and read address signal received from the address selecting means.

With this construction, based on the area designation signal as well as the write address signal and the read address signal from the address selecting means, setting of an actual write address and read address on the dual port memory is executed by the address setting means. Thus, one set of data is written into continuous two writing areas that are successively switched among the three writing areas obtained by equally trisecting the dual port memory, and thereafter the written data is read. Since the aforementioned m is not smaller than the maximum value Dmax of |fi−i| with respect to all the translation rules, the apparatus can deal with the translation rules of a plurality of types.

Alternatively, $2^n$-piece data sets may be successively inputted to the write port of the dual port memory. And, if an input order and an output order for the $2^n$-piece data in one set are i and fi, respectively, a maximum value of |fi−i| with respect to all translation rules is Dmax, and $2^{(n-1)} \geq$ Dmax, then the dual port memory has a storage capacity of $3\{2^{(n-1)}\}$ pieces of data.

Further, the dual port memory may segmented into three writing areas each having a storage capacity of $2^{(n-1)}$ pieces of data. Then, the apparatus may further comprise an address setting means which sets a next write address and a next read address but one for the dual port memory based on an area designation signal for designating a next writing area of the dual port memory and the write address signal and read address signal received from the address selecting means.

With this construction, based on the area designation signal as well as the write address signal and the read address signal from the address selecting means, setting of the actual write address and read address on the dual port memory is executed by the address setting means. Thus, one set of data is written into continuous two writing areas that are successively switched among the three writing areas obtained by equally trisecting the dual port memory, and thereafter the written data is read.

Since $2^{(n-1)}$ is not smaller than the maximum value Dmax of |fi−i| with respect to all the translation rules, the apparatus can deal with the translation rules of a plurality of types. Furthermore, since each writing area has a storage capacity corresponding to the $2^{(n-1)}$ pieces of data, the address generating means can be simply constructed of only a binary counter.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 2A, 2B, 2C, 2D, 2E, 2F and 2G show variations of various signals used in the apparatus of FIG. 1 in the stage of designating a forward translation;

FIGS. 3A, 3B, 3C, 3D, 3E, 3F and 3G show variations of various signals used in the apparatus of FIG. 1 in the stage of designating a backward translation;

FIGS. 5A and 5B show different translation tables used in the apparatus of FIG. 1.

FIGS. 8A, 8B, 8C, 8D, 8E, 8F and 8G show variations of various signals used in the apparatus shown in FIGS. 6 and 6A in the stage of designating a forward translation;

FIGS. 9A, 9B, 9C, 9D, 9E, 9F and 9G show variations of various signals used in the apparatus shown in FIGS. 6 and 6A in the stage of designating a backward translation;

FIG. 11 shows a translation rule applied to the sequential type permutation apparatus shown in FIG. 10;

FIG. 12 shows a translation rule different from that of FIG. 11;

FIGS. 19A, 19B, 19C and 19D are charts each showing an example of a translation rule applied to the prior art sequential type permutation apparatus shown in FIG. 18;

FIGS. 21A, 21B, 21C, 21D, 21E and 21F show variations of various signals used in the apparatus shown in FIG. 18;

DETAILED DESCRIPTION OF THE PREFERRED EMBODIMENTS

The present invention will be described in detail below with reference to the accompanying drawings.

First Embodiment

Figure 1:
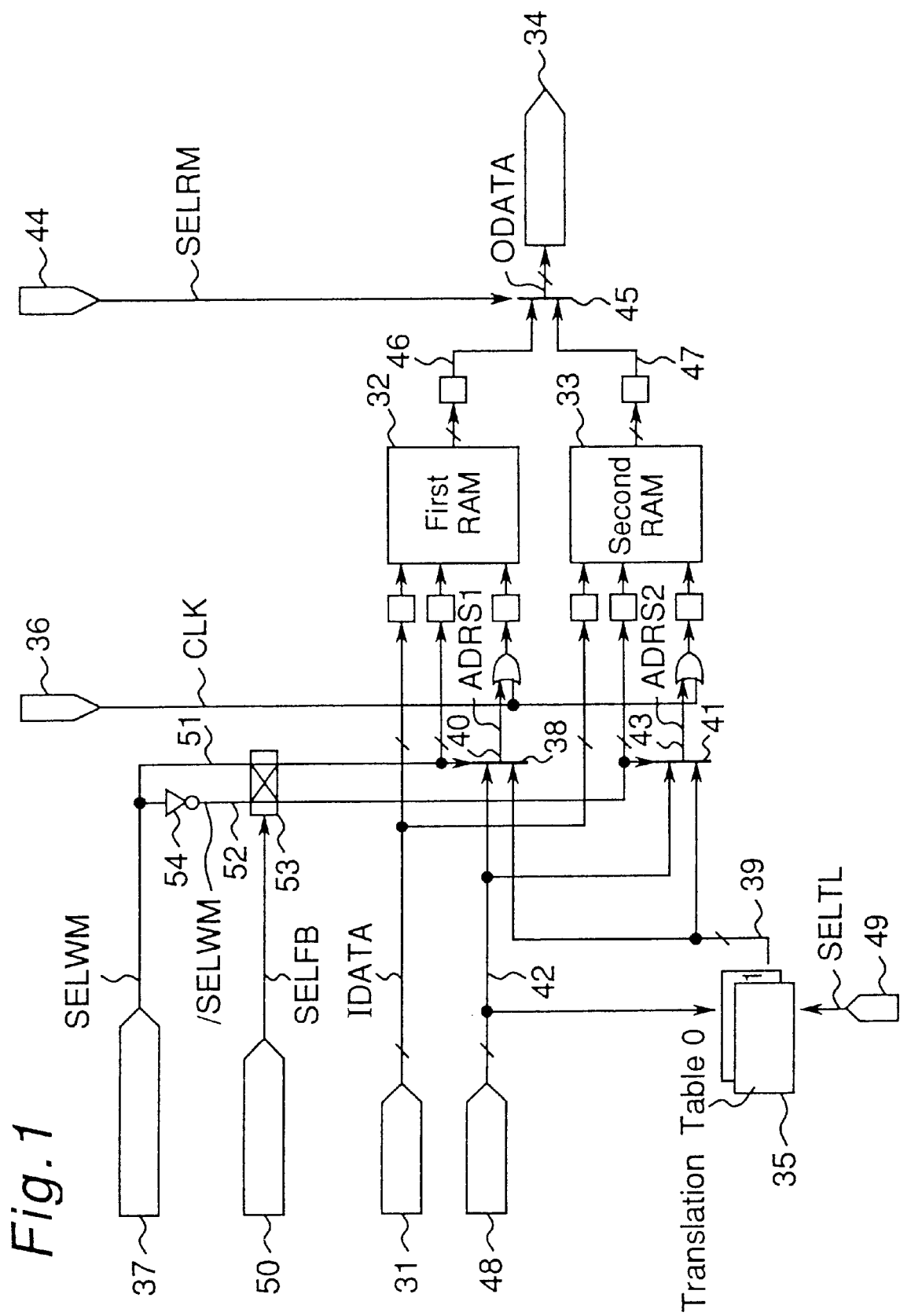
FIG. 1 is a block diagram of a sequential type permutation apparatus according to an embodiment of the present invention.

FIG. 1 shows the concrete circuit construction of a sequential type permutation apparatus of the present embodiment.

Figure 18:
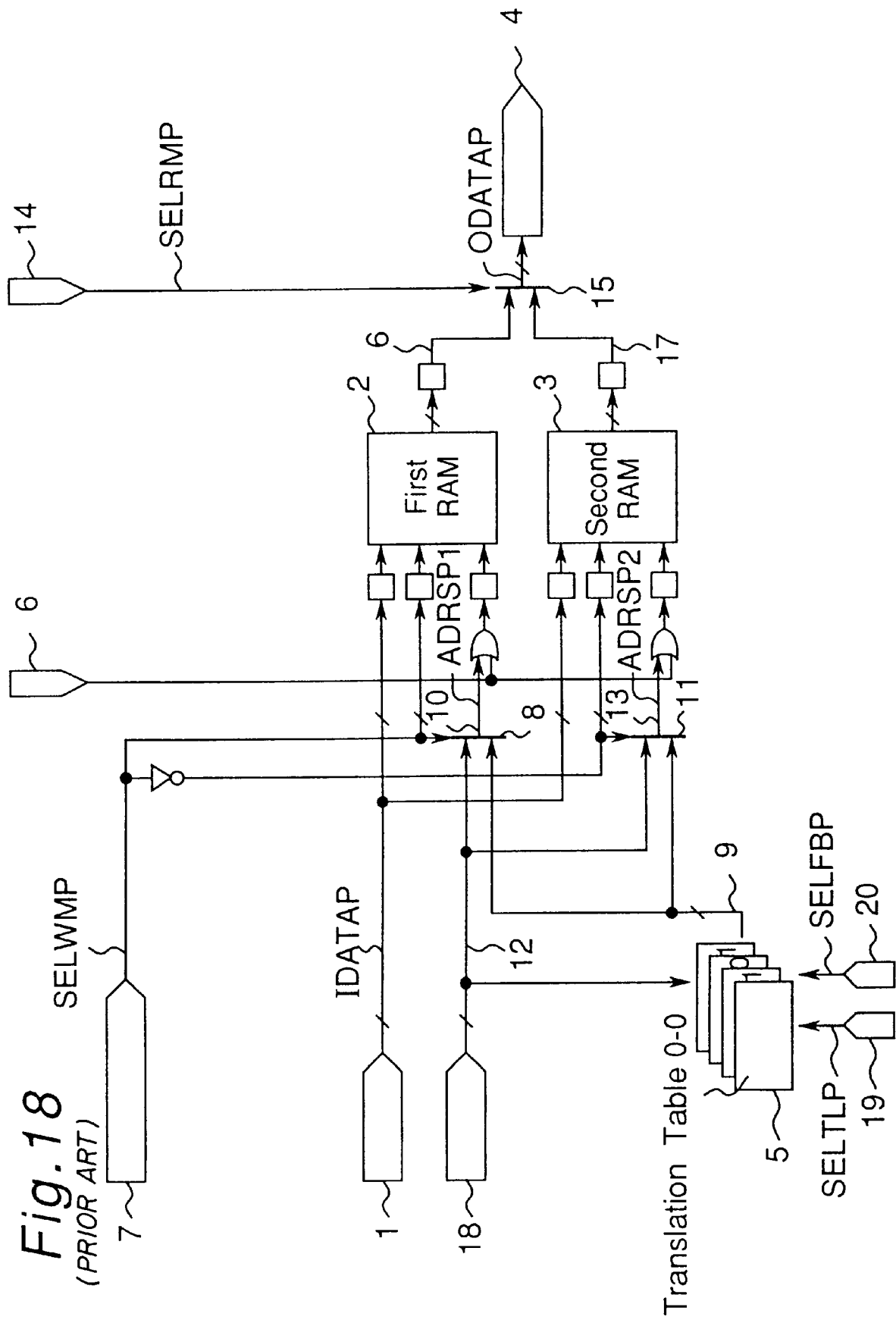
FIG. 18 is a circuit diagram of a prior art sequential type permutation apparatus.
Figure 20A:
FIGS. 20A and 20B are charts showing a correspondence between output signals SELTLP and SELFBP of a table selection input terminal and a forward/backward translation selection terminal and the designated translation table in the apparatus of FIG. 18.
Figure 20B:
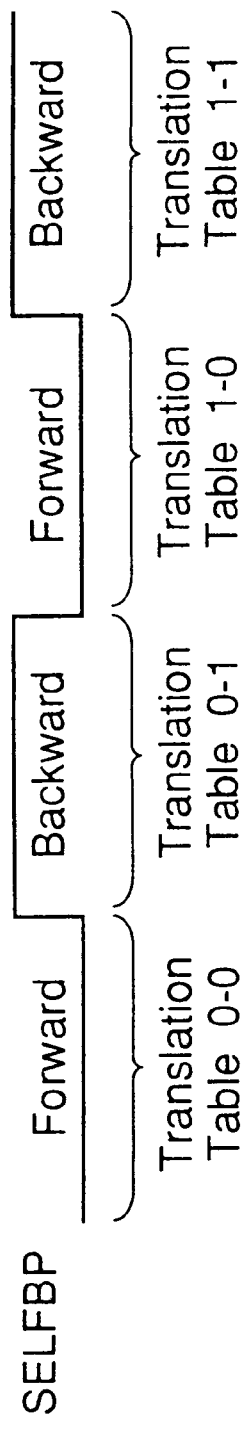

A data input terminal 31, a first RAM 32, a second RAM 33, a data output terminal 34, a clock input terminal 36, a write memory selection terminal 37, a first selector 38, a translated address bus 39, a first node 40, a second selector 41, an input address bus 42, a second node 43, a read memory selection terminal 44, a third selector 45, a third node 46, a fourth node 47 and an address input terminal 48 have constructions and operations similar to those of the data input terminal 1, first RAM 2, second RAM 3, data output terminal 4, clock input terminal 6, write memory selection terminal 7, first selector 8, translated address bus 9, first node 10, second selector 11, input address bus 12, second node 13, read memory selection terminal 14, third selector 15, third node 16, fourth node 17 and address input terminal 18 of the prior art sequential type permutation apparatus shown in FIG. 18.

The first and second selectors 38 and 41 constitute the address selecting means as recited in claims.

An address translation table memory 35 is a read only memory which stores two types of translation table for forward translation rules: a translation table 0 (same as the translation table 0-0 shown in FIG. 19A) and a translation table 1 (same as the translation table 1-0 shown in FIG. 19C), as shown in FIGS. 5A and 5B. In each of the translation tables, a plurality of "order numbers in the input stage" and a plurality of "order numbers in the output stage" are stored in pairs. If an input address identical to a certain "order number in the input stage" is given from the address input terminal 48 to the input address bus 42, then, the corresponding "order number in the output stage" is outputted to the translated address bus 39.

Figures 4, 6A, 7:
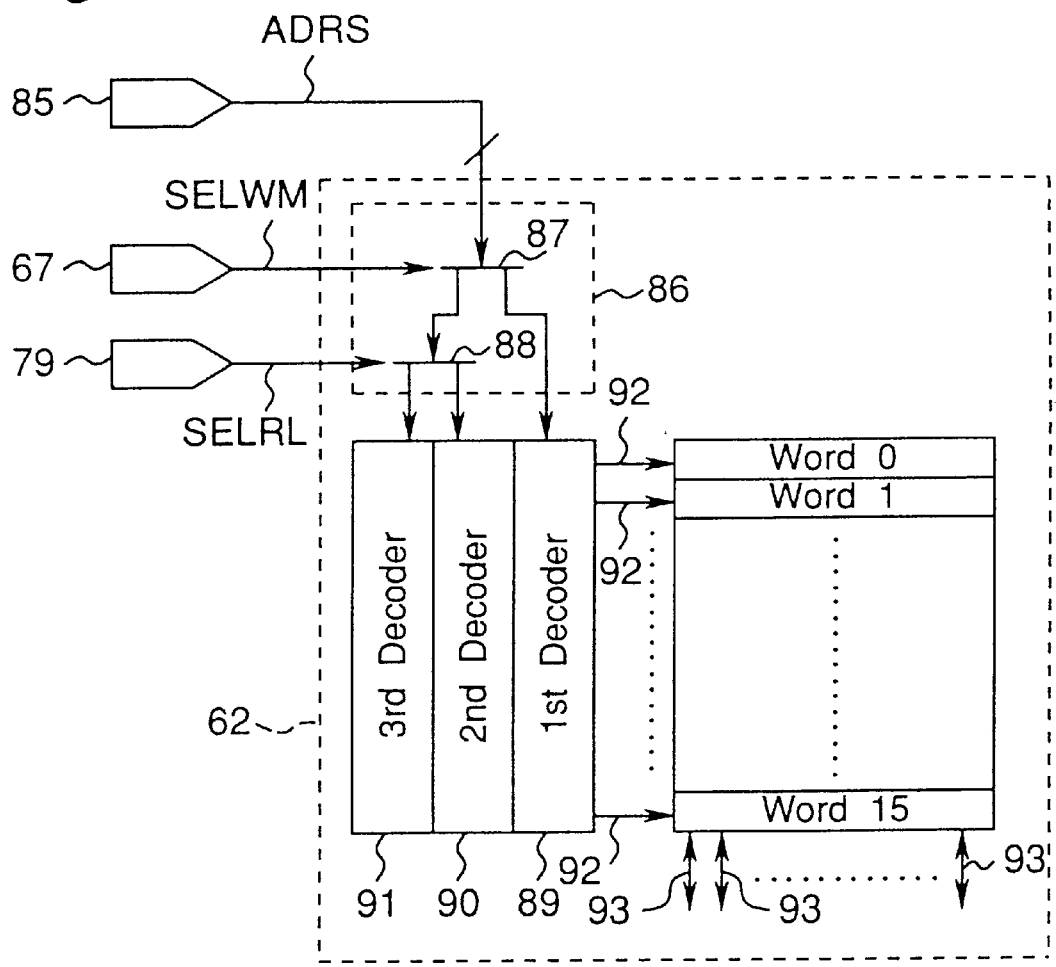
FIG. 4 is a chart showing a correspondence between an output signal SELTL at a table selection input terminal and the designated translation table in the apparatus of FIG. 1.
FIG. 6A is a diagram showing a part of the internal construction of a RAM shown in FIG. 6.
FIG. 7 is a chart showing a correspondence between an output signal SELRL at a translation rule selection terminal and the designated decoder in the apparatus of FIG. 6.

Which of the translation tables in the address translation table memory 35 should be used, is specified by an output signal SELTL from a table selection input terminal 49. That is, as shown in FIG. 4, the translation table 0 is designated when the output signal SELTL of the table selection input terminal 49 has a logical level of "0", and the translation table 1 is designated when the output signal SELTL has a logical level of "1".

It is to be noted that the logical level of the output signal SELTL of the table selection input terminal 49 does not change while a forward translation process or a backward translation process is executed.

A forward/backward translation selection terminal 50 is connected to a switching circuit 53 provided between a signal line 51 extending from the write memory selection terminal 37 to the first selector 38 and a signal line 52 extending from the write memory selection terminal 37 to the second selector 41. When the output signal SELFB of the forward/backward translation selection terminal 50 has a logical level of "0", the switching circuit 53 switches over so that a signal SELWM from the write memory selection terminal 37 is supplied to the first selector 38 and that a signal /SELWM obtained by inverting the signal SELWM from the write memory selection terminal 37 by an inverter 54 is supplied to the second selector 41.

That is, the switching circuit 53 constitutes the mode selecting means as recited in claims, and signals SELWM and /SELWM supplied from the switching circuit 53 to the first selector 38 and the second selector 41 constitute the address selection control signal.

Therefore, an "order number in the output stage" read from the address translation table memory 35 to the translated address bus 39 is supplied as a write address to a write memory (either one of the first and second RAMs 32, 33) specified by the signal from the write memory selection terminal 37. On the other hand, an input address outputted from the address input terminal 48 to the input address bus 42 is supplied as a read address to a read memory (the other of the first and second RAMs 32, 33). That is, the forward translation process is selected.

On the other hand, when the output signal SELFB of the forward/backward translation selection terminal 50 has a logical level of "1", the switching circuit 53 switches over so that the signal SELWM from the write memory selection terminal 37 is supplied to the second selector 41, and the signal /SELWM inverted by the inverter 54 is supplied to the first selector 38.

Therefore, the input address outputted to the input address bus 42 is supplied as a write address to the write memory specified by the signal SELWM from the write memory selection terminal 37. On the other hand, the "order number in the output stage" outputted to the translated address bus 39 is supplied as a read address to the read memory. That is, the backward translation process is selected.

By the above operations, when a combination (x, y) of a logical level x of the output signal SELTL of the table selection input terminal 49 and a logical level y of the output signal SELFB of the forward/backward translation selection terminal 50 is (0, 0), the forward translation process using the translation table 0 is executed. Similarly, a backward translation process using the translation table 0 is executed in the case of (0, 1), a forward translation using the translation table 1 is executed in the case of (1, 0), and a backward translation using the translation table 1 is executed in the case of (1, 1).

The permutation processing for input data performed by the sequential type permutation apparatus shown in FIG. 1 will be described below with reference to the charts of signal variations shown in FIGS. 2A–2G and 3A–3G.

The first RAM 32 and the second RAM 33 can each store therein sixteen pieces of data. Input data are given in sets of sixteen pieces through the data input terminal 31 in synchronization with a clock signal CLK from the clock input terminal 36.

In this case, it is here assumed that the forward translation has been designated as a consequence of the output signal SELFB of the forward/backward translation selection terminal 50 having a logical level of "0" and that the translation table 0 has been designated as a consequence of the output signal SELTL of the table selection input terminal 49 having a logical level of "0".

First, in an interval A, when the logical level of the signal SELWM from the write memory selection terminal 37 becomes "1", the first selector 38 selects the "order number in the output stage" (i.e., the translated address associated with the input address) of the translation table 0 on the translated address bus 39 and supplies it (signal ADRS1) as the write address to the first node 40. Consequently, a first set of sixteen pieces of data (signal IDATA) coming from the data input terminal 31 are written at random into the first RAM 32.

Subsequently, in an interval B, the logical level of the signal SELWM from the write memory selection terminal 37 and the signal SELRM from the read memory selection terminal 44 become "0". Then, the first selector 38 selects the input address on the input address bus 42 and supplies it (signal ADRS1) as the read address to the first node 40. On the other hand, the second selector 41 selects the translated address of the translation table 0 on the translated address bus 39 and supplies it (signal ADRS2) as the write address to the second node 43.

Consequently, a second set of sixteen pieces (signal IDATA) supplied through the data input terminal 31 are written at random into the second RAM 33. In the meantime, the sixteen pieces of data of the first set are sequentially read from the first RAM 32 and transmitted to the data output terminal 34 as signal ODATA.

Subsequently, in an interval C, the logical levels of the signals SELWM and SELRM from the write memory selection terminal 37 and the read memory selection terminal 44 become "1". Then, the first selector 38 selects the translated address of the translation table 0 on the translated address bus 39 and supplies it (signal ADRS1) as the write address to the first node 40. On the other hand, the second selector 41 selects the input address on the input address bus 42 and supplies it (signal ADRS2) as the read address to the second node 43.

Consequently, a third set of sixteen pieces of data supplied through the data input terminal 31 is written at random into the first RAM 32. In the meantime, the sixteen pieces of data of the second set are sequentially read from the second RAM 33 and transmitted to the data output terminal 34 as signal ODATA.

The above operations will be repeated subsequently. Thus, similarly to the case of FIGS. 21A through 21F, the random data writing and the sequential data reading are alternately executed on the first RAM 32. Further, the sequential data reading and the random data writing are alternately executed on the second RAM 33 inversely in phase to the first RAM 32. Further, data read from the second RAM 33 and data read from the first RAM 32 are alternately transferred to the data output terminal 34. Thus, the forward translation operation is executed.

The following describes the permutation in the case where the backward translation is designated as a consequence of the output signal SELFB of the forward/backward translation selection terminal 50 having a logical level of "1".

In this case, the switching circuit 53 is switched so that it transmits the signal SELWM from the write memory selection terminal 37 and its inverted signal /SELWM to the selectors converse to those used in the forward translation process.

First, in an interval D shown in FIGS. 3A–3G, when the logical level of the signal SELWM from the write memory selection terminal 37 becomes "1", the first selector 38 selects the input address on the input address bus 42 and supplies it (signal ADRS1) as the write address to the first node 40. Consequently, sixteen pieces of data of a first set from the data input terminal 31 are sequentially written into the first RAM 32.

Subsequently, in an interval E, the logical levels of the signals SELWM and SELRM from the write memory selection terminal 37 and the read memory selection terminal 44 become "0". Then, the first selector 38 selects the translated address of the translation table 0, conversely to the interval B of the forward translation process, and supplies it (signal ADRS1) as the read address to the first node 40. On the other hand, the second selector 41 selects the input address and supplies it (signal ADRS2) as the write address to the second node 43.

Consequently, sixteen pieces of data of a second set from the data input terminal 31 are sequentially written into the second RAM 33. In the meantime, the sixteen pieces of data of the first set are read at random from the first RAM 32 and transmitted to the data output terminal 34.

Subsequently, in an interval F, the logical level of the signals SELWM and SELRM from the write memory selection terminal 37 and the read memory selection terminal 44 become "1". Then, the first selector 38 selects the input address and supplies it (signal ADRS1) as the write address to the first node 40. On the other hand, the second selector 41 selects the translated address of the translation table 0 and supplies it (signal ADRS2) as the read address to the second node 43.

Consequently, sixteen pieces of data of a third set (signal IDATA) supplied through the data input terminal 31 are sequentially written into the first RAM 32. In the meantime, the sixteen pieces of data of the second set are read at random from the second RAM 33 and transmitted as signal ODATA to the data output terminal 34.

The above operations are repeated subsequently. Thus, a sequential data writing and a random data reading are alternately executed on the first RAM 32. Further, the random data reading and the sequential data writing are alternately executed on the second RAM 33 inversely in phase to the first RAM 32. Further, the data read from the second RAM 33 and the data read from the first RAM 32 are alternately outputted to the data output terminal 34. That is, the backward translation is executed.

As described above, the present embodiment is provided with the switching circuit 53 which switches over in accordance with the logical level of the output signal SELFB of the forward/backward translation selection terminal 50 to permit the signal SELWM from the write memory selection terminal 37 to be supplied to the first selector 38 or the second selector 41 while permitting the inverted signal /SELWM of the signal SELWM to be supplied to the second selector 41 or the first selector 38.

Then, in the case of the forward translation process (during which the output signal SELFB of the forward/backward translation selection terminal 50 has a logical level of "0"), one of the first and second selectors 38, 41 that is associated with the writing RAM selects the translated address on the translated address bus 39. On the other hand, the other of the first and second selectors that is associated with the reading RAM selects the input address on the input address bus 42. In the case of the backward translation process (during which the output signal SELFB of the forward/backward translation selection terminal 50 has a logical level of "1"), the selector corresponding to the writing RAM selects the input address on the input address bus 42. On the other hand, the selector corresponding to the reading RAM selects the translated address on the translated address bus 39.

As a result, the "order number in the output stage" of a single translation table is able to be used as both the write address and the read address. That is, both of the forward translation process and the backward translation process can be executed with the use of a single translation table. Therefore, it is only required to store only one of the forward translation table or the backward translation table in the address translation table memory 35.

That is, according to the present embodiment, the storage capacity of the address translation table memory 35 is allowed to be one half of that of the prior art, so that the storage capacity is prevented from being made larger than is necessary.

Second Embodiment

Figure 6:
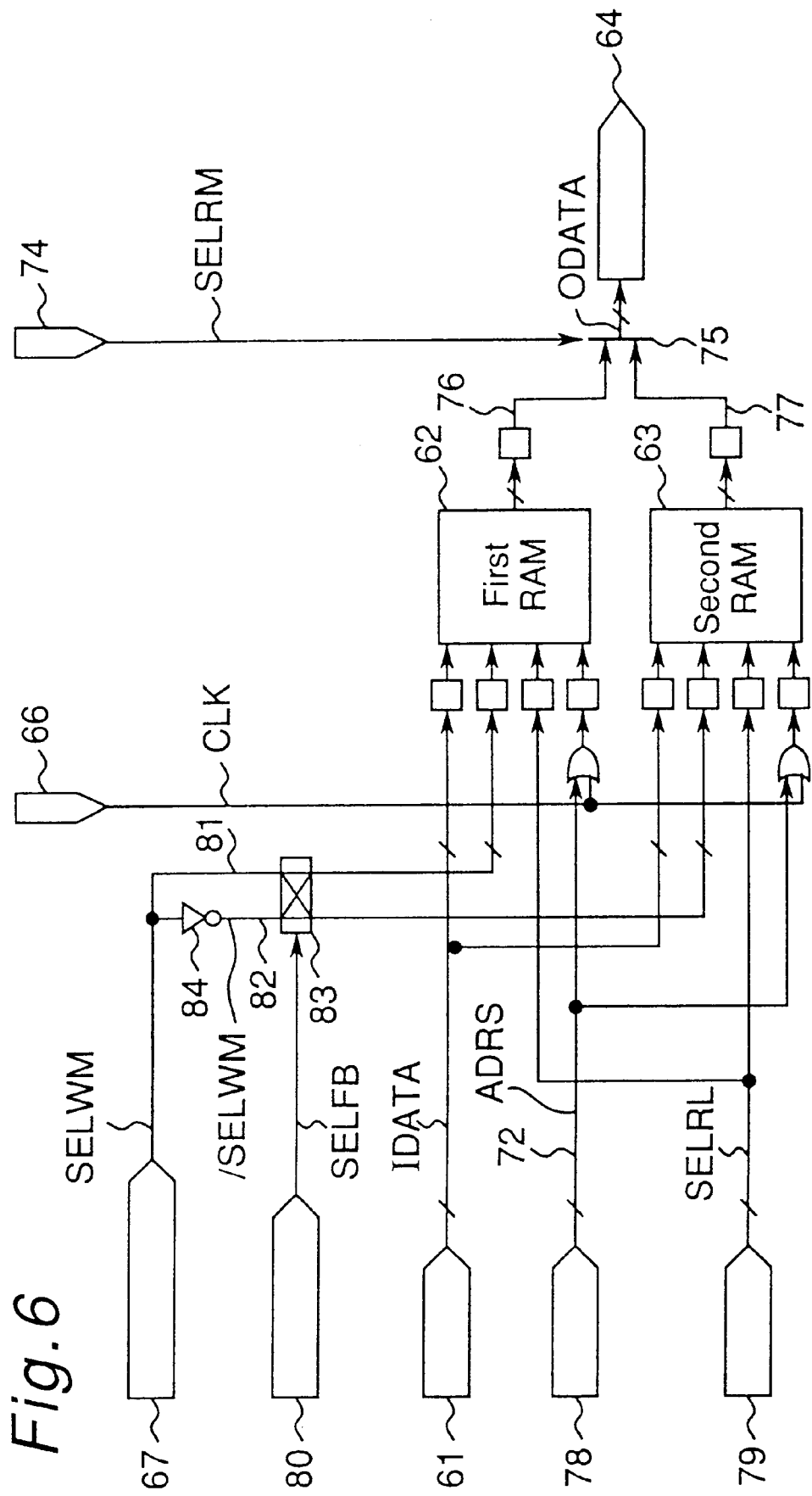
FIG. 6 is a block diagram of a sequential type permutation apparatus according to another embodiment of the present invention.

FIG. 6 shows the concrete circuit construction of the sequential type permutation apparatus of the present embodiment.

A data input terminal 61, a data output terminal 64, a clock input terminal 66, a write memory selection terminal 67, an input address bus 72, a read memory selection terminal 74, a selector 75, a first node 76, a second node 77, an address input terminal 78, a forward/backward translation selection terminal 80 and a switching circuit 83 have constructions and operations similar to those of the data input terminal 31, data output terminal 34, clock input terminal 36, write memory selection terminal 37, input address bus 42, read memory selection terminal 44, third selector 45, third node 46, fourth node 47, address input terminal 48, forward/backward translation selection terminal 50 and switching circuit 53 of the sequential type permutation apparatus of the first embodiment shown in FIG. 1.

The switching circuit 83 constitutes the mode selecting means as recited in claims.

The sequential type permutation apparatus of the present embodiment is designed such that an address signal ADRS outputted from the address input terminal 78 to the input address bus 72 is directly supplied to a first RAM 62 and a second RAM 63 without interposition of any selector.

Further, there is provided no address translation table memory for storing therein the translation table, and an output signal SELRL of a translation rule selection terminal 79 corresponding to the table selection input terminal 49 of the first embodiment is directly supplied to the first RAM 62 and the second RAM 63.

FIG. 6A is a diagram showing a part of the internal construction of the RAM 62. The RAM 63 has the same construction as that of the RAM 62 shown in FIG. 6. As described above, an input address (read/write address) signal ADRS transmitted through the input address bus 72 to an address bus 85 is supplied to one of a first decoder 89, a second decoder 90 or a third decoder 91 selected by a decoder selection circuit 86, and then decoded there. The decoder selection circuit 86 is comprised of a first multiplexer 87 and a second multiplexer 88. Then, according to this decoding result, a corresponding word line 92 is activated. Then, the activated word is subjected to data read/write via bit lines 93 . . . , 93. The second multiplexer 88 constitutes the decoder selecting means as recited in claims.

It is to be noted that in the sequential type permutation apparatus shown in FIG. 6, the 8-bit data pieces, 16 of which constitute a set, are written into or read from the first and second RAMs 62 and 63 set by set and therefore, both the RAMs 62 and 63 each comprise sixteen words for storing therein the 8-bit data pieces. Accordingly, there are sixteen word lines 92 and eight bit lines 93. Furthermore, it is required to individually designate the sixteen words in both the RAMs 62 and 63, and therefore, the address bus 85 requires a signal line corresponding to four bits.

The first decoder 89 decodes the input address inputted through the address bus 85 as it is. Therefore, when the input address is supplied to the first decoder 89, the words of the RAMs 62 and 63 are sequentially activated from the word 0. Further, the second decoder 90 decodes the input address according to the "order number in the output stage" of the translation table 0 shown in FIG. 5A. Therefore, when the input address ADRS is supplied to the second decoder 90, the words of the RAMs 62 and 63 are activated at random according to the translation table 0. The third decoder 91 decodes the input address ADRS according to the "order number in the output stage" of the translation table 1 shown in FIG. 5B. Therefore, when the input address is supplied to the third decoder 91, the words of the RAMs 62 and 63 are activated at random according to the translation table 1.

Selection of the decoder 89, 90 or 91 is executed by the decoder selection circuit 86 as follows.

First, the first multiplexer 87 selects the first decoder 89 to transmit the input address signal ADRS thereto when the output signal SELWM of the write memory selection terminal 67 has a logical level of "0". When the output signal SELWM of the write memory selection terminal 67 has a logical level of "1", the first multiplexer 87 selects the second or third decoder 90 or 91 to transmit the input address signal ADRS thereto. On the other hand, the second multiplexer 88 selects the second decoder 90 to transmit the input address signal ADRS thereto when the output signal SELRL of the translation rule selection terminal 79 has a logical level of "0". Also, the second multiplexer 88 selects the third decoder 91 when the output signal SELRL of the translation rule selection terminal 79 has a logical level of "1".

With the above arrangement, merely by supplying the input address ADRS to the decoder selection circuit 86, the words of the first and second RAMs 62 and 63 are activated sequentially or at random according to the translation table 0 or at random according to the translation table 1 depending on the output signals SELWM and SELRL of the write memory selection terminal 67 and the translation rule selection terminal 79.

Therefore, the present embodiment requires neither the address translation table memory for storing therein the translation tables nor the translated address bus for transmitting the "order number in the output stage" of each translation table.

The permutation of input data executed by the sequential type permutation apparatus shown in FIGS. 5 and 6 will be described with reference to the charts of signal variations shown in FIGS. 8A–8G and 9A–9G.

It is assumed here that the second decoder 90 has been designated by the second multiplexer 88 as a consequence of the output signal SELRL of the translation rule selection terminal 79 having a logical level of "0", as shown in FIG. 7. Further, it is assumed that the forward translation process has been designated as a consequence of the output signal SELFB of the forward/backward translation selection terminal 80 having a logical level of "0".

First, in an interval G, when the logical level of the signal SELWM from the write memory selection terminal 67 becomes "1", the first multiplexer 87 of the first RAM 62 selects the second decoder 90. Then, by this second decoder 90, the input address ADRS supplied from the address bus 85 is decoded according to the "order number in the output stage" (i.e., the translated address associated with the input address) of the translation table 0. As a result, sixteen pieces of data of a first set supplied from the data input terminal 61 are written at random into the first RAM 62.

Subsequently, when the logical levels of the signals SELWM and SELRM from the write memory selection terminal 67 and the read memory selection terminal 74 become "0" in an interval H, the first multiplexer 87 of the first RAM 62 selects the first decoder 89, while the first multiplexer 87 of the second RAM 63 selects the second decoder 90. Then, the input address is decoded by the first decoder 89 as it is, on the first RAM 62 side. On the other hand, on the second RAM 63 side, the input address is decoded according to the translated address of the translation table 0 by the second decoder 90.

Consequently, sixteen pieces of data of a second set supplied from the data input terminal 61 are written at random into the second RAM 63. In the meantime, the sixteen pieces of data of the first set are sequentially read from the first RAM 62 and transmitted to the data output terminal 64.

Subsequently, when the logical levels of the signals SELWM and SELRM from the write memory selection terminal 67 and the read memory selection terminal 74 become "1" in an interval I, the first multiplexer 87 of the first RAM 62 selects the second decoder 90, and the first multiplexer 87 of the second RAM 63 selects the first decoder 89. Then, the input address is decoded according to the translated address of the translation table 0 by the second decoder 90 on the first RAM 62 side. On the other hand, on the second RAM 63 side, the input address inputted from the address bus 85 is decoded by the first decoder 89 as it is.

Consequently, another sixteen pieces of data of a third set from the data input terminal 61 are written at random into the first RAM 62. In the meantime, the sixteen pieces of data of the second set are sequentially read from the second RAM 63 and transmitted to the data output terminal 64.

The above operations are repeated subsequently. Thus, similarly to the case of FIGS. 2A–2G, the random data writing and the sequential data reading are alternately executed on the first RAM 62. Further, the sequential data reading and the random data writing are alternately executed on the second RAM 63 inversely in phase to the first RAM 62. Further, data read from the second RAM 63 and data read from the first RAM 62 are alternately supplied the data output terminal 64. Thus, the forward translation is executed.

It is to be noted that, when the third decoder 91 has been designated with the logical level of the output signal SELRL of the translation rule selection terminal 79 being "1", the decoding of the translated address is executed based on the translation table 1 (translation rule 1) by the first RAM 62 in the interval G, then by the second RAM 63 in the interval H, and then by the first RAM 62 in the interval I.

The following describes the permutation in the case where the backward translation is designated as a consequence of the output signal SELFB of the forward/backward translation selection terminal 80 having a logical level of "1".

In this case, the switching circuit 83 is switched to transmit the signal SELWM from the write memory selection terminal 67 and its inverted signal /SELWM to the RAMs 62 and 63 conversely to the case of the forward translation.

First, in an interval J shown in FIGS. 9A–9G, when the logical level of the signal SELWM from the write memory selection terminal 67 becomes "1", the first multiplexer 87 of the first RAM 62 selects the first decoder 89. Then, the input address is decoded as it is by the first decoder 89. Consequently, sixteen pieces of data of a first set supplied from the data input terminal 61 are sequentially written into the first RAM 62.

Subsequently, in an interval K, when the logical levels of the signals SELWM and SELRM from the write memory selection terminal 67 and the read memory selection terminal 74 become "0", the first multiplexer 87 of the first RAM 62 selects the second decoder 90, and the first multiplexer 87 of the second RAM 63 selects the first decoder 89. Then, the input address is decoded according to the translated address of the translation table 0 by the second decoder 90 on the first RAM 62 side. On the other hand, on the second RAM 63 side, the input address is decoded as it is by the first decoder 89.

Consequently, sixteen pieces of data of a second set supplied from the data input terminal 61 are sequentially written into the second RAM 63. In the meantime, the sixteen pieces of data of the first set are read at random from the first RAM 62 and transmitted as signal ODATA to the data output terminal 64.

Subsequently, in an interval L, when the logical levels of the signals SELWM and SELRM from the write memory selection terminal 67 and the read memory selection terminal 74 become "1", the first multiplexer 87 of the first RAM 62 selects the first decoder 89, and the first multiplexer 87 of the second RAM 63 selects the second decoder 90. Then, the input address is decoded as it is on the first RAM 62 side. On the other hand, on the second RAM 63 side, the input address is decoded according to the translated address of the translation table 0.

Consequently, sixteen pieces of data of a third set given from the data input terminal 61 are sequentially written into the first RAM 62. In the meantime, the sixteen pieces of data of the second set are read at random from the second RAM 63 and transmitted as ODATA to the data output terminal 64.

The above operations will be repeated subsequently. Thus, the sequential data writing and the random data reading are alternately executed on the first RAM 62. Also, the random data reading and the sequential data writing are alternately executed on the second RAM 63 inversely in phase to the first RAM 62. Further, the data read from the second RAM 63 and the data read from the first RAM 62 are alternately outputted as ODATA to the data output terminal 64. Thus, the backward translation is executed.

As described above, in the present embodiment, the first RAM 62 and the second RAM 63 are each provided with the first decoder 89 for decoding the input address as it is, the second decoder 90 for executing decoding based on the translated address associated by one translation rule with the input address, the third decoder 91 for executing decoding based on the translated address associated by the other translation rule with the input address, the first multiplexer 87 and the second multiplexer 88.

Then, in the case of the forward translation (i.e., when the output signal SELFB of the forward/backward translation selection terminal 80 has a logical level of "0") , the first multiplexer 87 of the writing RAM selects the second or third decoders 90 or 91, while the first multiplexer 87 of the reading RAM selects the first decoder 89. On the other hand, in the case of the backward translation (i.e., when the output signal SELFB of the forward/backward translation selection terminal 80 has a logical level of "1"), the first multiplexer 87 of the writing RAM selects the first decoder 89, and the first multiplexer 87 of the reading RAM selects the second or third decoders 90 or 91.

Further, in the case of conversion based on the translation table 0 (i.e., when the output signal SELRL from the translation rule selection terminal 79 has a logical level of "0"), the second multiplexers 88 of the RAMs 62 and 63 select the second decoder 90. In the case of conversion based on the translation table 1 (i.e., when the output signal SELRL from the translation rule selection terminal 79 has a logical level of "1"), the second multiplexers 88 of the RAMs 62 and 63 select the third decoder 91.

As a result, merely by supplying the input address ADRS to the decoder selection circuit 86 comprised of the first and second multiplexers 87 and 88, the words of the first and second RAMs 62 and 63 are activated sequentially or at random according to the translation table 0 or at random according to the translation table 1 depending on the output signals SELWM and SELRL of the write memory selection terminal 67 and the translation rule selection terminal 79. Therefore, the forward/backward translation conforming to a plurality of translation rules can be executed using neither the address translation table memory 35 nor the translated address bus 39 of the first embodiment.

That is, the present embodiment can eliminate the address translation table memory 35 of the first embodiment and thus reduce the circuit area of the bus, thereby preventing the power consumption from being made greater than is necessary. Furthermore, the address signal to be supplied to the decoders 89 through 91 is only the input address ADRS. Therefore, by expressing the input address in the format using a Gray code, a signal transition probability of the address bus 85 is able to be simply minimized.

Figure 22:
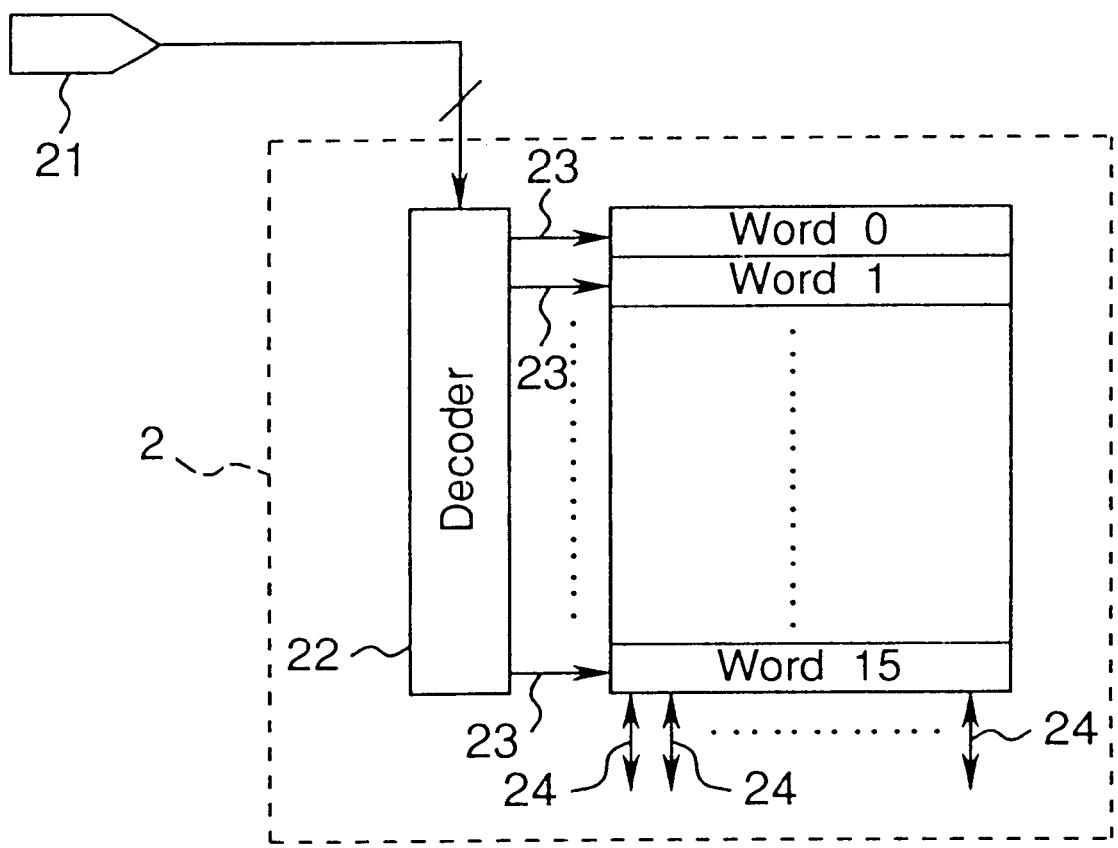
FIG. 22 is a diagram showing a part of the internal construction of a RAM shown in FIG. 18.
Figure 23:
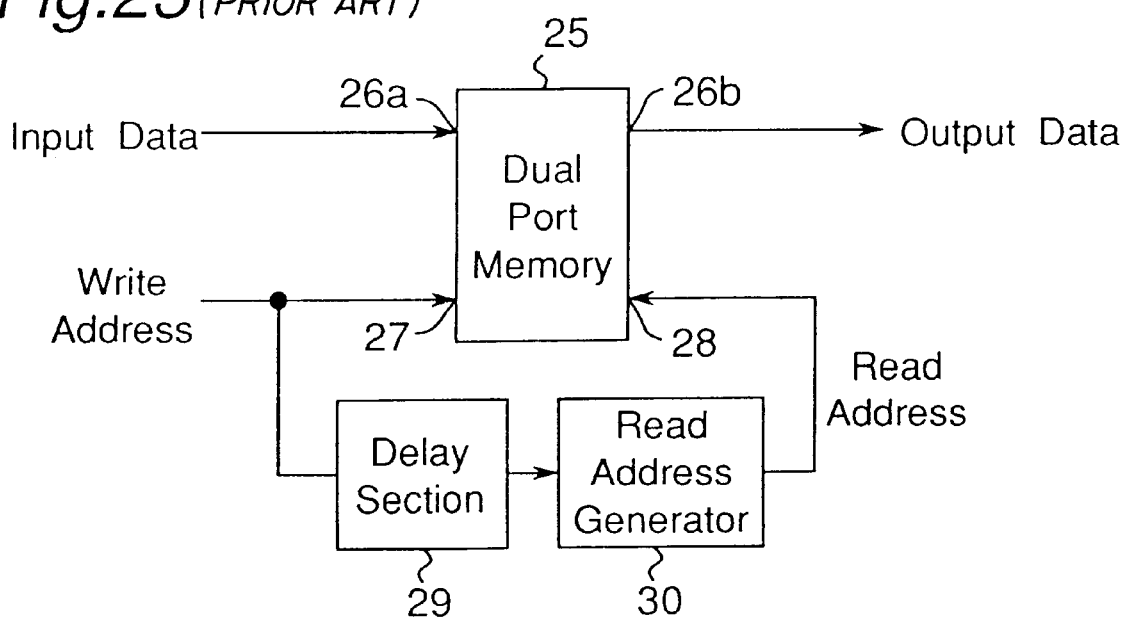
FIG. 23 is an explanatory view of a dual port memory employed in prior art sequential type permutation apparatus.
Figure 24:
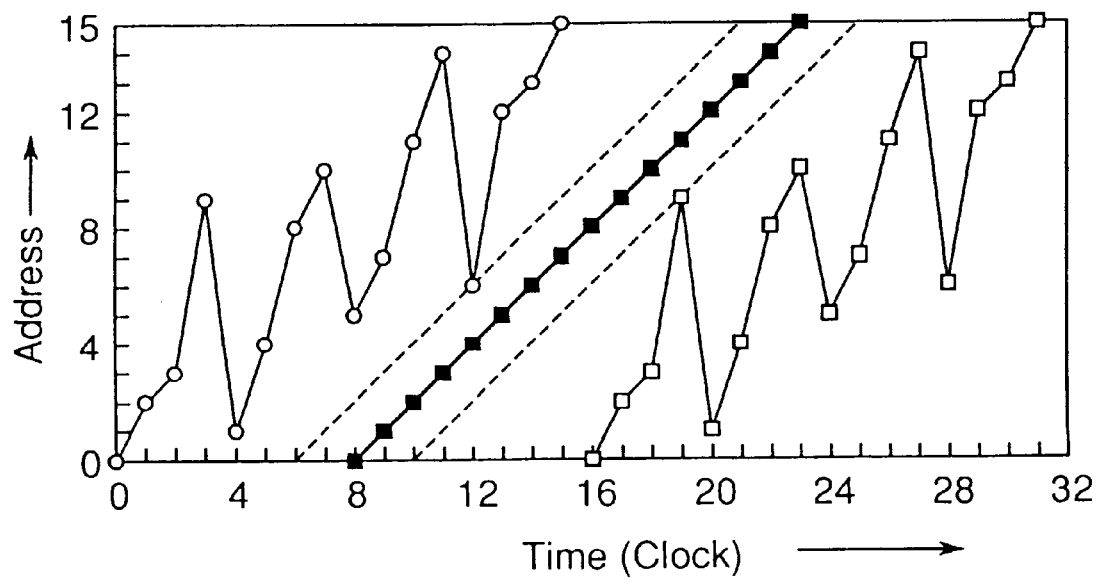
FIG. 24 is a graph showing an address transition when the dual port memory shown in FIG. 23 is subjected to writing and reading according to the translation rules shown in FIGS. 19A–19D.

Note that the decoders of the RAMs 62 and 63 increase in number in accordance with increase of the number of translation rules. However, the basic structure of each decoder is similar to that of the decoder 22 shown in FIG. 22, and therefore, it can be implemented by a circuit structure simpler than that of the address translation table memory. Therefore, the increase in number of the decoders does not impair the effect of the present invention.

Although in each of the aforementioned embodiments, the forward translation and the backward translation are executed according to the two types of translation tables 1 and 0, shown in FIGS. 5A and 5B, in which the forward translation rule is tabulated, the translation tables to be used are not limited to the above two types. When increasing the number of translation tables, the address translation table memory 35 is only required to store the increased number of the translation tables in the case of the first embodiment. In the case of the second embodiment, it is required to increase the number of the input address decoders provided in the RAMs 62 and 63.

Furthermore, although the input address is the sequential address in each of the above embodiments, the same effect can be obtained even when it is a random address.

Furthermore, the relationship between the logical levels of the output signals of the forward/backward translation selection terminals 50 and 80 and the switching of the switching circuits 53 and 83 in each of the above embodiments may also be reversed.

Furthermore, although sixteen pieces of data are grouped in one set for simplicity of explanation in each of the above embodiments, the number of pieces of data is not limitative in the present invention.

Furthermore, each of the above first and second embodiments, by providing two RAMs and simultaneously executing the write and read operations on different RAMs, allows the converted data to be outputted continuously. However, it is also acceptable to provide a single dual port memory instead of the two RAMs and alternately execute the write and read operations on the dual port memory, thereby intermittently outputting the converted data.

Third Embodiment

The present embodiment is related to a sequential type permutation apparatus having a dual port memory which provides for a plurality of translation rules, and which is designed not only to read one set of data after completing the writing of the data, but also to concurrently execute the data write and data read independently of each other.

Figure 10:
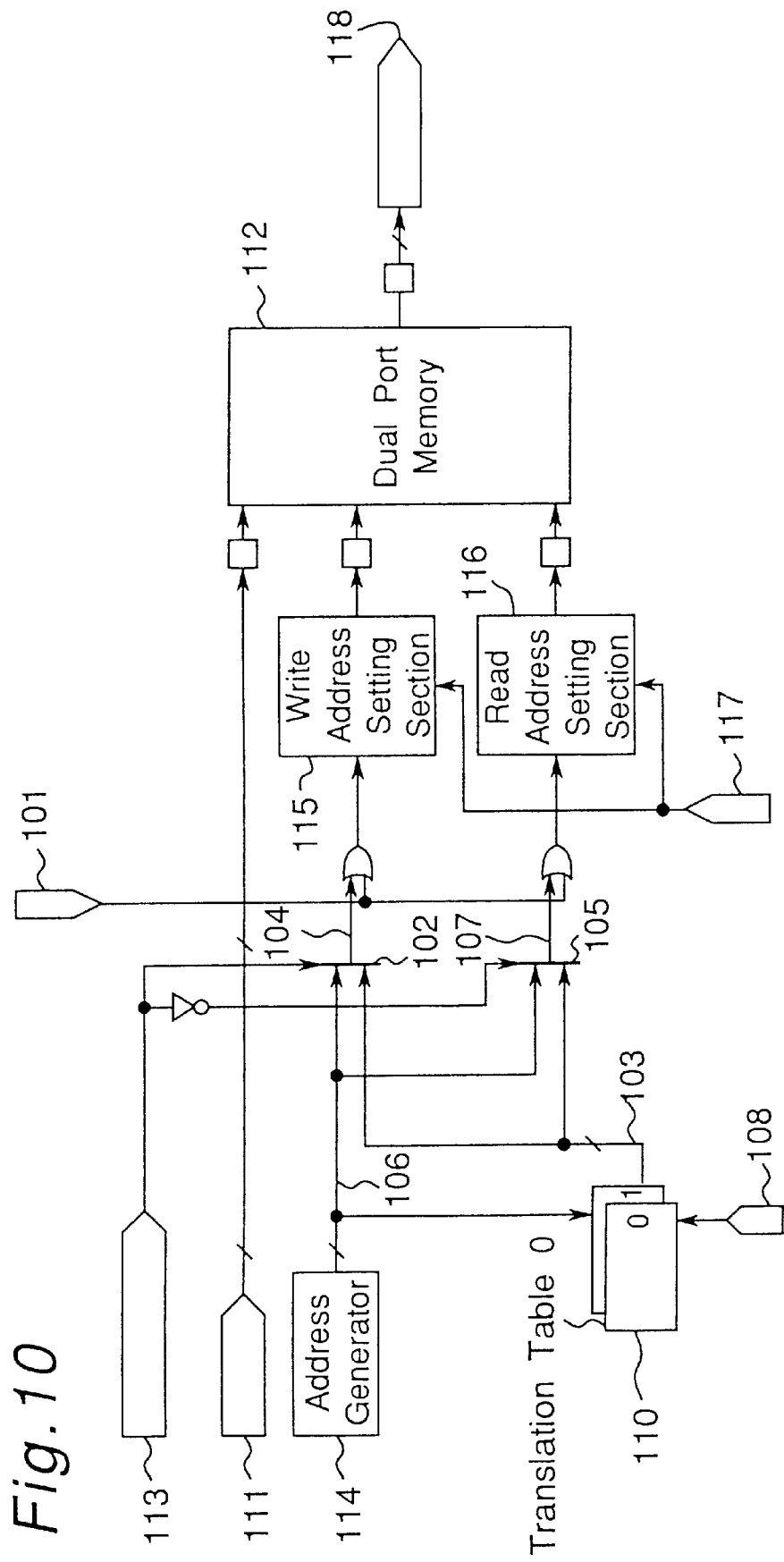
FIG. 10 is a block diagram of a sequential type permutation apparatus according to a third embodiment of the present invention.

FIG. 10 shows the concrete circuit construction of a sequential type permutation apparatus of the present embodiment.

A clock input terminal 101, a first selector 102, a translated address bus 103, a first node 104, a second selector 105, an input address bus 106, a second node 107 and a table selection input terminal 108 have constructions and operations similar to those of the clock input terminal 36, first selector 38, translated address bus 39, first node 40, second selector 41, input address bus 42, second node 43 and table selection input terminal 49 of the sequential type permutation apparatus of the first embodiment shown in FIG. 1.

An address translation table memory 110 of the present embodiment stores therein a translation table 0 and a translation table 1 in which two types of translation rule (translation rule 0 and translation rule 1) shown in FIGS. 11 and 12 are respectively incorporated. The translation tables 0 and 1 shown in FIGS. 11 and 12 represent the permutation rule adopted in an actual digital VTR, and they are translation tables each for executing the permutation with 64 pieces of data grouped in one set.

Input pieces of data of one set supplied through a data input terminal 111 are written into a dual port memory 112 capable of executing the reading and the writing concurrently independently of each other, according to a translation table designated by a signal output from the table selection input terminal 108. Then, by reading the written pieces of data according to the designated translation table, the pieces of data in one set whose order has been changed according to the translation rule are outputted. The write address in such an operation is controlled as follows.

When the signal from a forward/backward translation selection terminal 113 has a logical level of "1" (which designates the forward translation process), the first selector 102 selects the translated address signal on the translated address bus 103 and transmits it to the first node 104. Also, the second selector 105 selects an address signal supplied from an address generator 114 to the input address bus 106 and supplies it to the second node 107. On the other hand, when the signal from the forward/backward translation selection terminal 113 has a logical level of "0" (which designates the backward translation), the first selector 102 selects the signal on the input address bus 106 and outputs it to the first node 104. Also, the second selector 105 selects the signal on the translated address bus 103 and outputs it to the second node 107.

In the present embodiment, one dual port memory 112 replaces the two RAMs used in the first and second embodiments, data are read after the completion of writing of these data, and the writing and the reading are executed concurrently but independently of each other. To realize these operations, it is necessary to set the actual write address and read address of the dual port memory 112 for one set of data based on a signal from the first node 104 and a signal from the second node 107, as described in detail later. Such address setting is executed by a write address setting section 115 and a read address setting section 116 upon receipt of a signal supplied from a region designation terminal 117.

Then, the read pieces of data that have been permuted, i.e., changed in order, are transmitted from the dual port memory 112 to a data output terminal 118.

The setting of the write address and the read address of the dual port memory 112 will be described in concrete below.

Figure 15A:
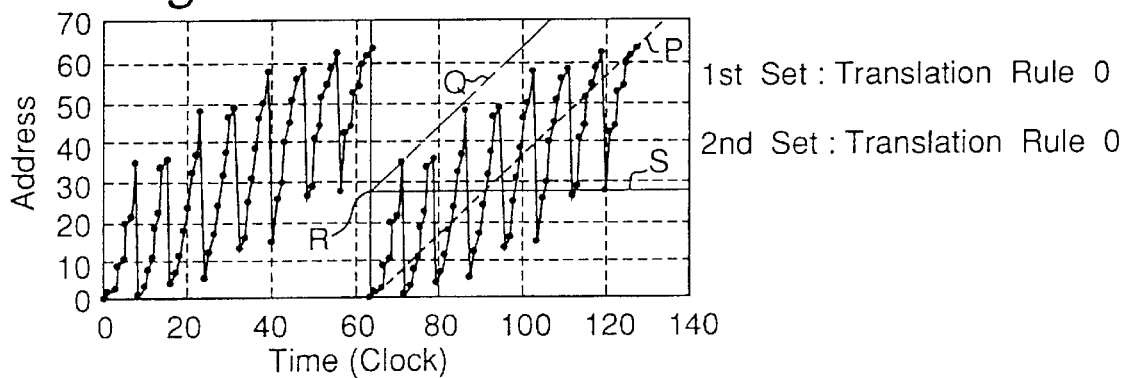
FIGS. 15A, 15B, 15C and 15D explanatory views of the transitions of the write address and the read address when a dual port memory having a storage capacity corresponding to one set of data is used as a data memory for a sequential type permutation apparatus.
Figure 15B:
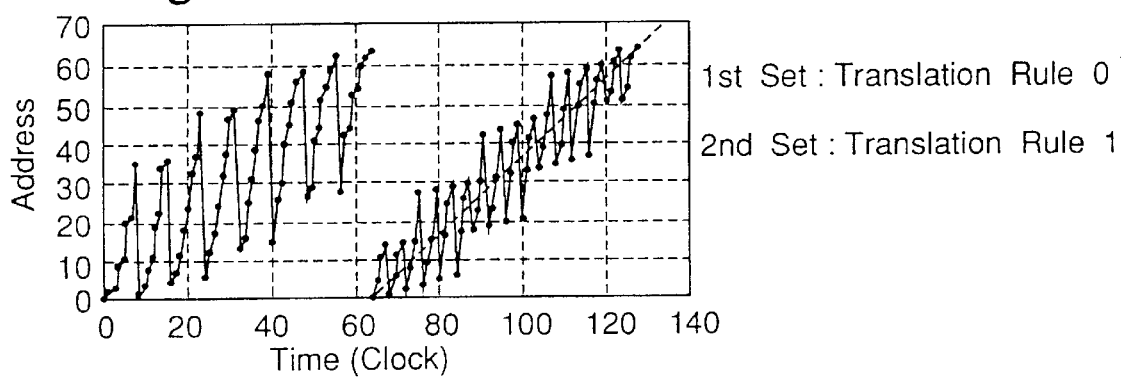
Figure 15C:
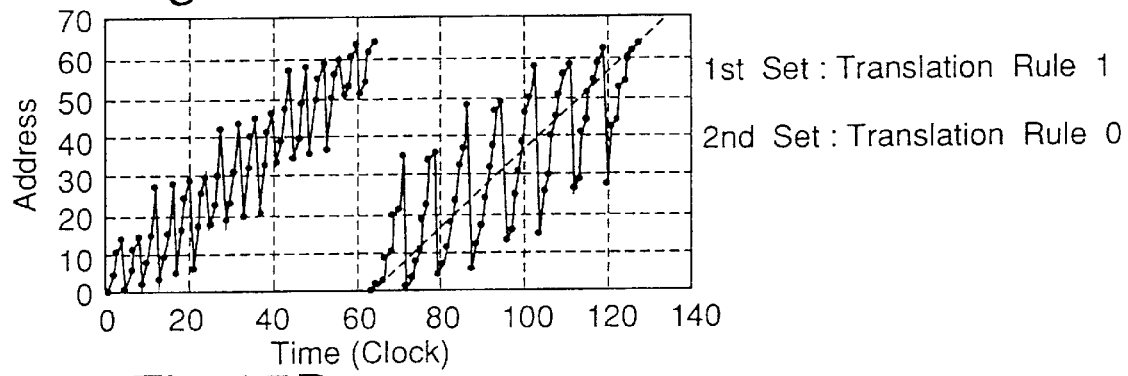
Figure 15D:
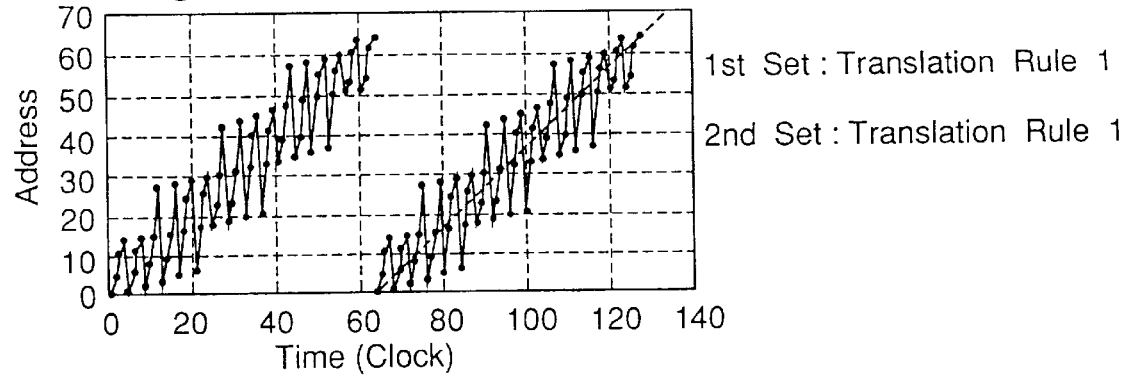

FIGS. 15A, 15B, 15C and 15D show transitions of the write address when a dual port memory having a capacity corresponding to one set of data pieces (corresponding to 64 words) is used as a memory into which 64-pieces-in-one-set data are written. FIG. 15A shows the address transition in the case of the forward translation in which the translation rule 0 shown in FIG. 11 is applied to the data of a first and second sets. FIG. 15B shows the address transition in the case of the forward translation in which the translation rule 0 is applied to the data of the first set and the translation rule 1 shown in FIG. 12 is applied to the data of the second set. FIG. 15C shows the address transition in the case of the forward translation in which the translation rule 1 is applied to the data of the first set and the translation rule 0 is applied to the data of the second set. FIG. 15D shows the address transition in the case of the forward translation in which the translation rule 1 is applied to the data of the first and second sets.

Referring to FIG. 15A, if an attempt is made to read the data of the first set at a point of time next to the point of time when the data write of the first set is completed, a broken straight line P representing the read address transition of the data of the first set crosses the write address transition of the data of the second set, so that the data of the first set cannot be read. Therefore, the dual port memory is expanded by an area below a straight line S, and data pieces to be written into the area below the straight line S are written into the expanded area (i.e., by increasing the address numbers for those data pieces by 64). On the other hand, the remaining data pieces to be written at addresses in an area above the straight line S are written at addresses whose numbers are decreased by "S". With this arrangement, the read address transition for the data of the first set represented by the straight line P does not cross the write address transition of the data of the second set written separately on the increased address side and the decreased address side.

It is to be noted that the straight line S is a line that is parallel to the axis of abscissas and passes a read start point R of the data of the first set on a straight line Q. Further, the straight line Q is a tangential line on the increased address side to the write address transition of the data of the second set, arranged parallel to the straight line P.

In this regard, the same thing can be also said for the cases of FIGS. 15B through 15D. Therefore, by expanding the memory area by a maximum value with respect to all the translation rules as described in detail below, there can be obtained a dual port memory which has a minimum storage capacity and which is able to deal with all the translation rules, read data after the completion of the writing of the data, and yet, execute the writing and the reading concurrently but independently of each other.

The above matter will be described in concrete below.

It is now assumed that the order number in the input stage is "i" and the order number in the output stage is "fi" in the above translation rules 0 and 1 shown in FIGS. 11 and 12. Then, a value D (=(fi−i)) is maximized when i=7 in the case of the translation rule 0, and the maximum value Dmax is 28 (=35−7). In the case of the translation rule 1, the value D is maximized when i=11 and 27, and the maximum value Dmax is 15 (=26−11=42−27). That is, in regard to the translation rules 0 and 1, it is when i=7 and fi=35 in the translation rule 0 that the write address for the data of the second set is located farthest on the increased address side from the straight line P representing the read address transition of the data of the first set. Therefore, the expansion capacity of the dual port memory of the present embodiment is made to be 28 words corresponding to (fi−i)=Dmax=28 for i=7 in the translation rule 0.

That is, the storage capacity of the dual port memory 112 is made to be "92 words" that is the sum of the storage capacity of "64 words" corresponding to the number of the 64 data pieces constituting a data set and the storage capacity of "28 words" corresponding to the Dmax. Then, the write address and the read address of the dual port memory 112 are set as follows.

Although the above description has been made taking the forward translation as an example, the same thing can be said for the backward translation. For the case of the backward translation, however, the sequential write and the random read are executed, and therefore, it is required to calculate D by (i−fi) in obtaining the expansion capacity of the dual port memory. That is, by defining D as D=|i−fi|, the applicable expansion capacity can be obtained regardless of the forward or backward translation.

Figure 13A:
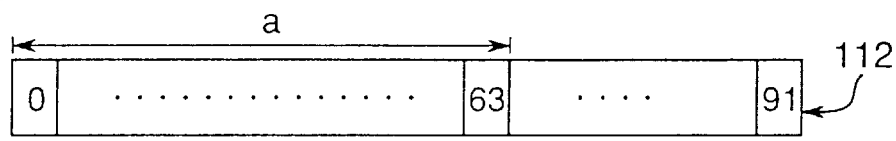
FIGS. 13A, 13B and 13C are charts showing the transition of a writing area and a reading area on the dual port memory shown in FIG. 10.
Figure 13B:
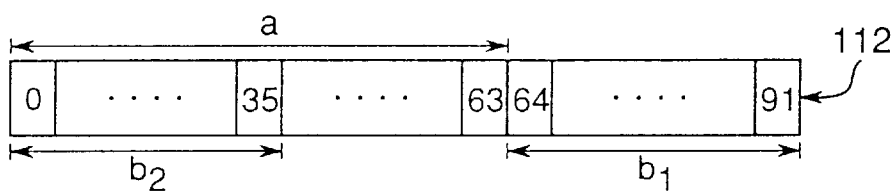
Figure 13C:
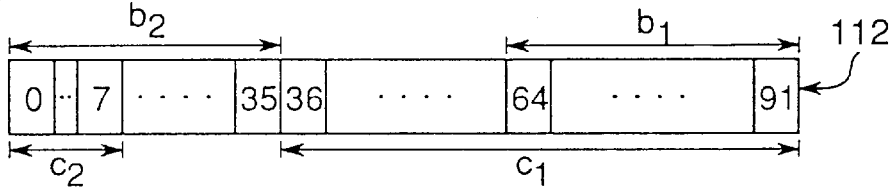

FIGS. 13A, 13B and 13C show the areas of the dual port memory 112. In these figures, for simplicity of explanation, the address number is identical to the "order number" of the translation rule 0 and the translation rule 1, and expressed by numerals 0 to 91.

First, data of a first set is written into an area a (64 words) ranging from an address 0 to an address 63, as shown in FIG. 13A.

Subsequently, data of a second set is written into an area $b_1$ (28 words) ranging from an address 64 to an address 91 and then into an area $b_2$ (36 words) ranging from the address 0 to an address 35 as shown in FIG. 13B. During the writing of the data of the second set, the data of the first set are read from the area a.

In this case, as described above, part of the data of the second set written into the area $b_1$ is the data to be written into the area below the straight line S in FIG. 15A. Also, the remaining data of the second set written into the area $b_2$ is the data to be written into the area above the straight line S in FIG. 15A. Furthermore, the address transition of the data to be written into the area above the straight line S in FIG. 15A does not cross the straight line Q. Therefore, the writing of the data of the second set into the area $b_2$ will not cause the data of the first set written in the area $b_2$ to be lost before being read.

Next, data of a third set are written into an area $c_1$ (56 words) ranging from an address 36 to an address 91 and into an area $c_2$ (8 words) ranging from the address 0 to an address 7 as shown in FIG. 13C. In the meantime, the data of the second set is read from the areas $b_1$ and $b_2$. In this case also, the data of the second set written in the areas $b_1$ and $c_2$ are not lost due to the writing of the data of the third set before being read.

The similar operations are repeated. In this way, the concurrent execution of the data write and data read are executed on the dual port memory 112.

The address setting as described above is achieved by operating the write address setting section 115, the read address setting section 116 and the area designation terminal 117, for example, as follows.

That is, a signal representing a first address of the next writing area obtained by adding "1" to the last address of the preceding writing area is supplied from the area designation terminal 117 to both the write address setting section 115 and the read address setting section 116.

Then, based on the first address signal and a signal transmitted from the first node 104, the write address setting section 115 obtains an address by adding the translated address to the first address of the next writing area in the case of the forward translation, and by adding the input address to the leading address of the next writing area in the case of the backward translation. It is to be noted that, when the address value obtained through the above addition is not smaller than 92, the number 92 is subtracted from the obtained address value. Thus, the next write address of the dual port memory 112 is set.

The read address setting section 116 retains two times the first address of the writing area specified by the first address signal. Then, based on the first address of the preceding writing area and a signal transmitted from the second node 107, the read address setting section 116 obtains an address by adding the input address to the first address of the preceding writing area in the case of the forward translation, and by adding the translated address to the first address of the preceding writing area in the case of the backward translation. In this case also, when the address value obtained through the above addition is not smaller than 92, the number "92" is subtracted from the obtained address value. Thus, the next read address of the dual port memory 112 is set.

Figure 14:
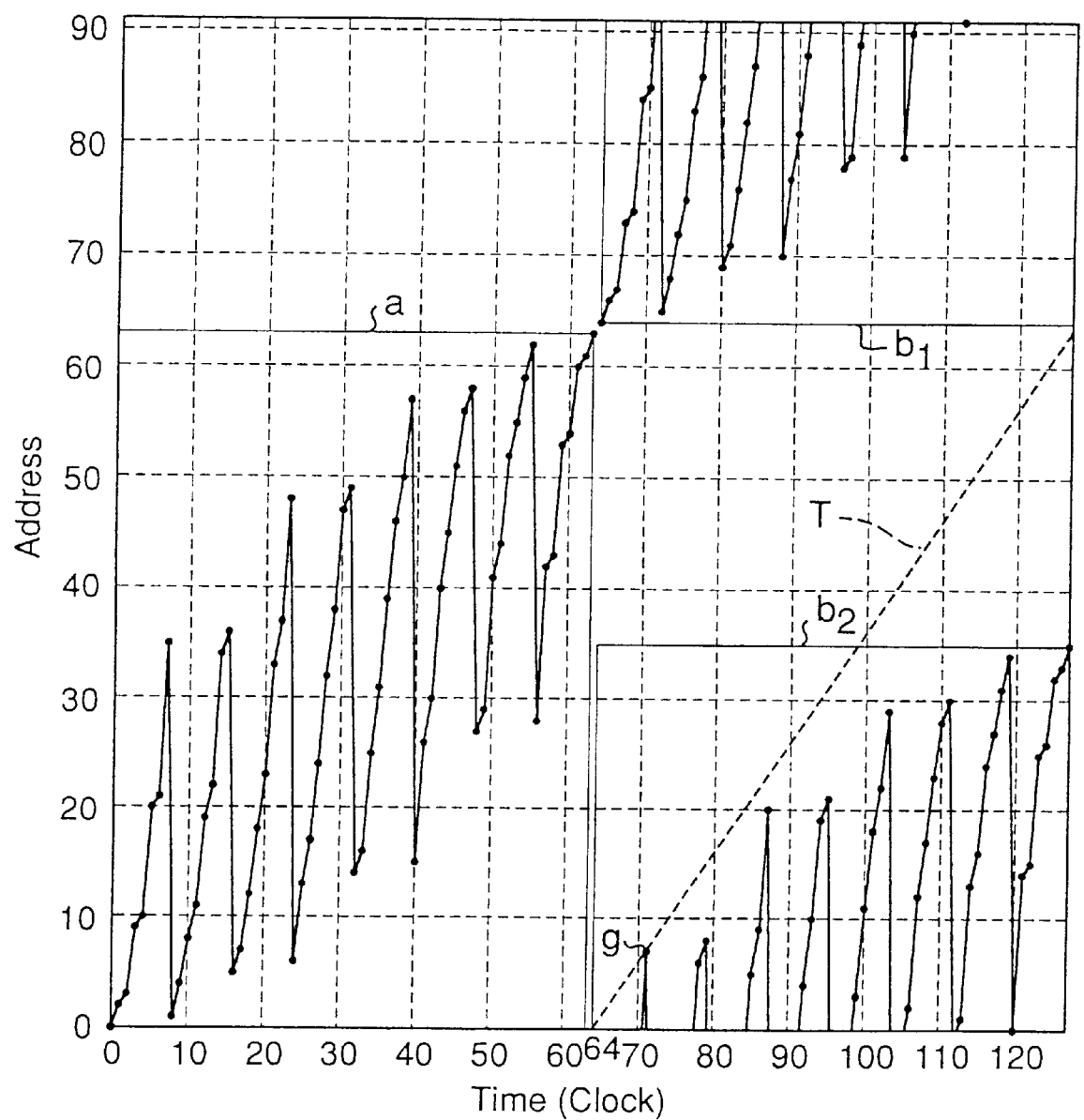
FIG. 14 is a graph showing an example of the transitions of the write address and the read address of the sequential type permutation apparatus shown in FIG. 10.

FIG. 14 shows the transitions of the write address and the read address of the dual port memory 112 in the case where the forward translation is executed by means of the translation rule 0. The axis of abscissas represents the time expressed by the number of clocks supplied from the clock input terminal 101, while the axis of ordinates represents the address (0 to 91) of the dual port memory 112. The solid lines indicate the transition of the write address, while the broken line T indicates the transition of the read address. It is to be noted that the areas a, $b_1$ and $b_2$ in FIG. 14 correspond to the areas a, $b_1$ and $b_2$ in FIGS. 13A, 13B and 13C.

FIG. 14 indicates that the once written data in each address will not be erased by the next writing before being read. In this case, the read address coincides with the write address at a point g at which D=Dmax, when the writing and the reading are executed simultaneously on an identical address. However, there is no problem in terms of the operation of the dual port memory.

As described above, the present embodiment is provided with the dual port memory 112 in place of the first RAM 32 and the second RAM 33 of the first embodiment. And, this dual port memory 112 is designed to have a storage capacity capable of writing pieces of data the number of which corresponds to the sum of the number N of pieces of data in one set and the maximum value Dmax of the absolute value $|fi-i|=D$ of the difference between the order number fi in the output stage and the order number i in the input stage among all the translation rules.

Further, the selection operations of the first selector 102 and the second selector 105 are controlled by a signal supplied from the forward/backward translation selection terminal 113 as follows. That is, in the stage of the forward translation, the first selector 102 selects the signal on the translated address bus 103 and outputs it to the write address setting section 115. At the same time, the second selector 105 selects the signal on the input address bus 106 and outputs it to the read address setting section 116. On the other hand, in the stage of the backward translation, the first selector 102 selects the signal on the input address bus 106 and outputs it to the write address setting section 115. At the same time, the second selector 105 selects the signal on the translated address bus 103 and outputs it to the read address setting section 116.

Then, the write address setting section 115 sets the next write address of the dual port memory 112 in the above-described manner based on the first address signal supplied from the area designation terminal 117 and the signal supplied from the first selector 102. Similarly, the read address setting section 116 sets the next read address based on the first address signal and the signal transmitted from the second selector 105.

Therefore, by providing the first address signal to be output from the area designation terminal 117 by a signal representing the address next to the last address of the preceding writing area, the read operation of a written set of data from the dual port memory 112 can be executed concurrently with but independently of the next write operation of another set of data.

Furthermore, the storage capacity of the dual port memory 112 is set based on the maximum value Dmax of the absolute value $|fi-i|=D$ of the difference between the order number fi in the output stage and the order number i in the input stage with regard to all the translation rules to be used. Therefore, the storage capacity of the dual port memory 112 can be minimized with regard to all different translation rules, provided that the reading of a set of data following the writing of this set of data is executed concurrently with but independently of the next writing of another set of data.

Fourth Embodiment

A sequential type permutation apparatus of the present embodiment has essentially the same construction as that of the sequential type permutation apparatus shown in FIG. 10, so that a diagram showing the construction of the present embodiment is omitted. Unlike the dual port memory 112 of the sequential type permutation apparatus shown in FIG. 10, however, a dual port memory in the present embodiment has a capacity of (N×1.5) words when the following condition:

$Dmax \leq N/2$ (N: the number of pieces of data in one set)

is satisfied.

This will be described in concrete below.

In the case of the forward translation by means of the translation rules shown in FIGS. 11 and 12, Dmax is 28, as described above, which value is smaller than N/2=64/2=32. Therefore, the dual port memory is designed to have a storage capacity of (N×1.5)=64×1.5=96 words.

Then, by means of a write address setting section, a read address setting section and an area designation terminal corresponding to the write address setting section 115, read address setting section 116 and area designation terminal 117 of the sequential type permutation apparatus shown in FIG. 10, the write address and the read address are set for each of areas obtained by trisecting the entire area of the dual port memory as follows.

Figure 16A:
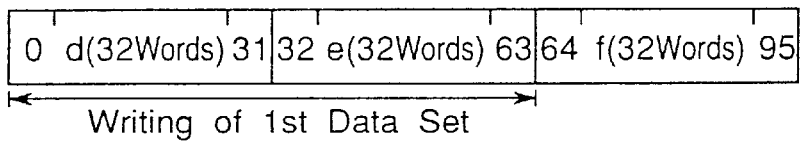
FIGS. 16A, 16B and 16C are charts showing the change of the writing area and the reading area on a dual port memory of a sequential type permutation apparatus different from those of FIGS. 1, 5 and 10.
Figure 16B:
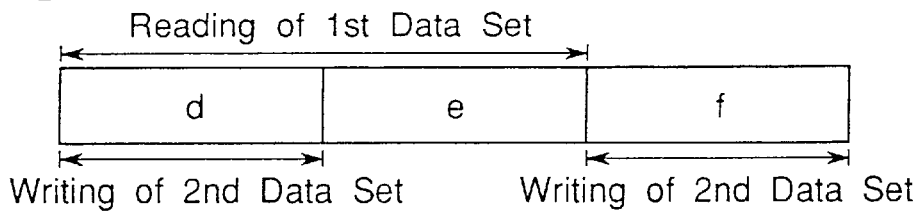
Figure 16C:
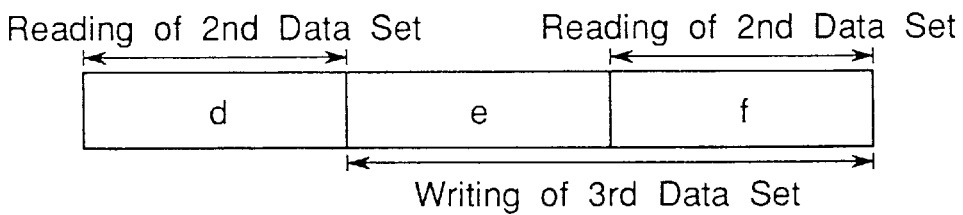

FIGS. 16A, 16B and 16C each show the whole area (address "0 to 95") of the dual port memory which is divided into three equal areas. Here, a first area (32 words) ranging from the address 0 to the address 31 is defined as an area d, a next area (32 words) ranging from the address 32 to the address 63 is defined as an area e, and another area (32 words) ranging from the address 64 to the address 95 is defined as an area f.

First, pieces of data of a first set are written to the areas d and e (64 words) as shown in FIG. 16A.

Then, pieces of data of a second set are written to the areas f and d (64 words) as shown in FIG. 16B. Meanwhile, the data of the first set are read from the areas d and e. At this time, for the reasons described in connection with the third embodiment, the writing of the data of the second set to the area d does not erase the data of the first set written in that area before its reading.

Then, pieces of data of a third set are written into the areas e and f (64 words) as shown in FIG. 16C. Meanwhile, the data of the second set are read from the areas f and d. At this time also, the writing of the data of the third set does not erase the already written data of the second set before its reading.

Similar operations will be repeated subsequently, and the data write and read operations are concurrently executed on the dual port memory.

The address setting as described above can be achieved by operating the write address setting section, the read address setting section and the area designation terminal, for example, as follows.

A 2-bit high-order address "00" for designating the area d, a 2-bit high-order address "01" for designating the area e, and a 2-bit high-order address "10" for designating the area f are set as the high-order address of the address "0 to 95" of the dual port memory.

Then, the area designation terminal successively outputs a high-order address signal representing the high-order addresses "00" and "01", a high-order address signal representing the high-order addresses "10" and "00" and a high-order address signal representing the high-order addresses "01" and "10" in a repeated manner in accordance with a timing at which one set of data is written.

Then, the write address setting section adds the 2 bits of the above high order address expressed by the high-order address signal to the low-order five bits of the 6-bit address signal expressing any one of "0" to "63" transmitted from the first node. Thus, the next write address of the dual port memory is set.

Further, the read address setting section adds the 2 bits of the high-order address expressed by the previously received high-order address signal to the low-order five bits of the 6-bit address signal currently transmitted from the second node. Thus, the next read address of the dual port memory is set.

Figure 17:
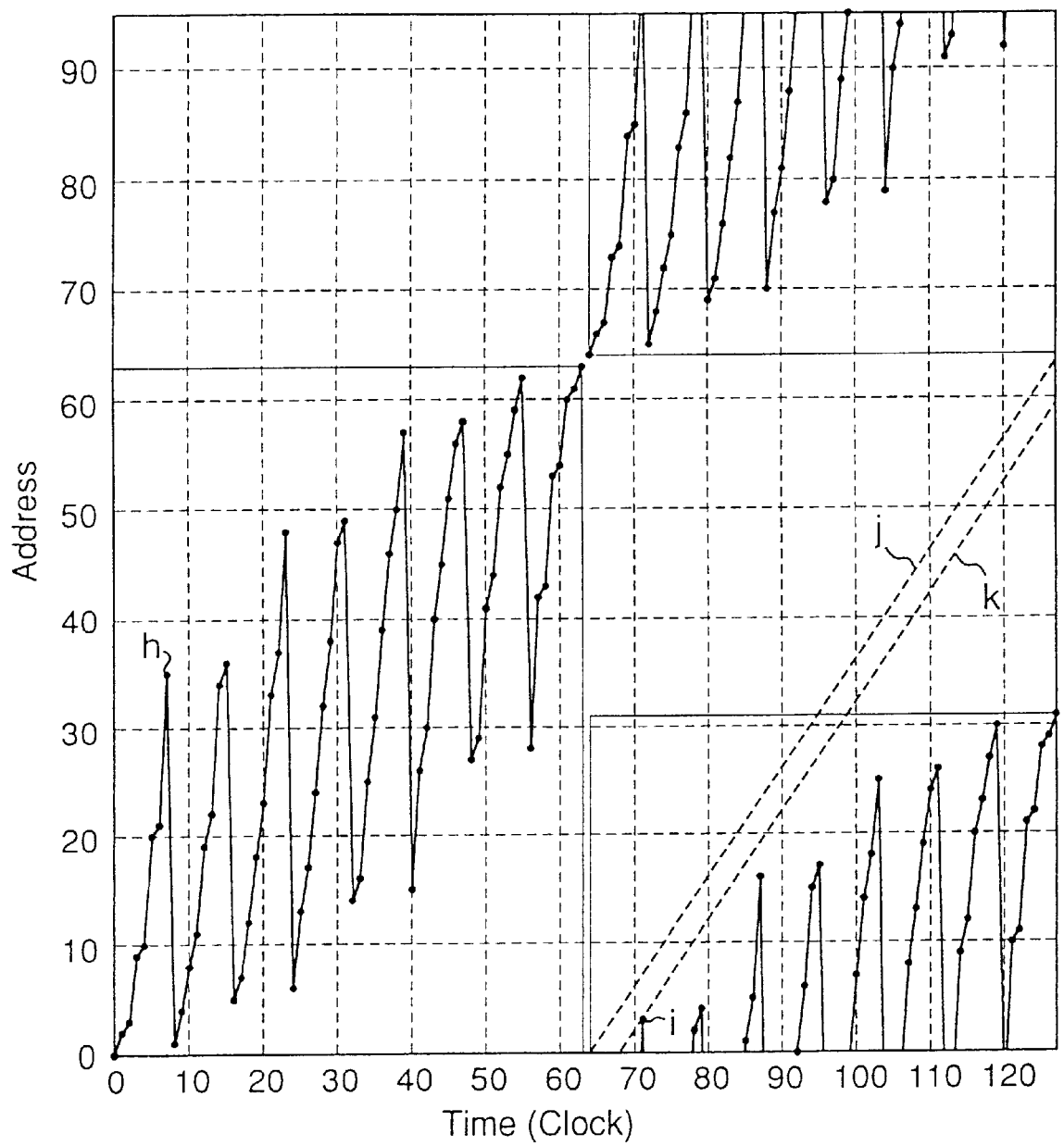
FIG. 17 is a graph showing an example of the transitions of the write address and the read address according to the change of the writing area and the reading area shown in FIGS. 16A, 16B and 16C.

FIG. 17 shows the transitions of the write address and the read address of the dual port memory when the backward translation is executed by means of the translation rule 0 of FIG. 11. In the figure, solid lines indicate the transition of the write address, and two broken lines j and k indicate the limits of the transition of the read address. That is, it is proper to set the read address so that its transition traces a straight line extending between and parallel to the broken lines j and k.

Setting of the write address will be described below by way of a concrete example with reference to FIG. 17.

In FIG. 17, with regard to the write address of the eighth data of the first set and the write address of the eighth data of the second set, each transmitted from the first node, a binary address "100011" representing a decimal address "35" is transmitted as apparent from FIG. 11.

However, in the stage of writing the data of the first set, the high-order addresses "00" and "01" are transmitted from the area designation terminal. Then, the write address setting section selects the high-order address "01" since the most significant bit of the binary address "100011" received from the first node represents "1". Then, the write address setting section adds the selected high-order address "01" to the least significant five bits "00011" of the binary address "100011" to generate a new 7-bit binary address "0100011" and sets it as the write address of the dual port memory. Therefore, the eighth data of the first set is written into the decimal address "35" as indicated by h in FIG. 17.

In the stage of writing the data of the second set, the high-order addresses "10" and "00" are transmitted from the area designation terminal. Then, the write address setting section selects the high-order address "00" since the most significant bit of the binary address "100011" received from the first node represents "1", and adds it to the least significant five bits "00011" of the binary address "1100011". Thus, a 7-bit binary address "0000011" is generated and set as the write address of the dual port memory. Therefore, the eighth data of the second data set is written into the decimal address "3" as indicated by i in FIG. 17.

As described above, in the present embodiment, when the maximum value Dmax of the absolute value |fi−i|=D of the difference between the order number fi in the output stage and the order number i in the input stage with regard to all the translation rules has a relation of Dmax≦N/2 with respect to the number N of one set of data, the dual port memory is given a storage capacity of (N×1.5) words. Therefore, by executing the setting of the write address and the read address of the dual port memory for each of three third parts d, e and f of the whole area, the read operation of a written set of data from the dual port memory can be executed concurrently with but independently of the next write operation of another set of data.

Furthermore, since the areas d, e and f are fixed areas, the designation of the area d, e or f can be executed from the area designation terminal with the high-order address of the dual port memory. Therefore, the storage capacity of the dual port memory of this embodiment becomes slightly larger than that of the third embodiment, however, the constructions of the write address setting section and the read address setting section can be simplified.

Fifth Embodiment

A sequential type permutation apparatus of the present embodiment also has substantially the same construction as that of the sequential type permutation apparatus shown in FIG. 10, so that a diagram showing the construction of the present embodiment is omitted. In the present embodiment, a dual port memory corresponding to the dual port memory 112 of the sequential type permutation apparatus shown in FIG. 10 is designed such that, when the following conditions:

$N=2^n$ and $Dmax \leq N/2 = 2^{(n-1)}$ (N: the number of data in one set)

are satisfied, the dual port memory has a capacity of N×1.5= $2^n \times 3/2 = (3 \times 2^{(n-1)})$ words.

Then, by means of a write address setting section, a read address setting section and an area designation terminal corresponding to the write address setting section 115, read address setting section 116 and area designation terminal 117 of the sequential type permutation apparatus shown in FIG. 10, the write address and the read address of the dual port memory are set for each of the trisected areas corresponding to $2^{(n-1)}$ words by designating the high-order address from the area designation terminal similarly to the case of the fourth embodiment.

It is to be noted that since the storage capacity of each area of the dual port memory is $2^{(n-1)}$ words in the present embodiment, an ordinary binary counter can be used as it is as an address generator corresponding to the address generator 114 of the sequential type permutation apparatus shown in FIG. 10.

That is, according to the present embodiment, the address generator can be simplified.

Although the forward translation and the backward translation are executed using the translation rules shown in FIGS. 11 and 12 in the third through fifth embodiments, the present invention is not limited to this.

Further, 64 pieces of data are grouped in one set in the third through fifth embodiments, but the number of data pieces in one set is not limitative in the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A sequential type permutation apparatus comprising:

an address translation table memory which stores therein a translation table for obtaining a translated address from an input address and which operates, upon receiving an input address signal from an address input terminal, to output a translated address signal corresponding to the input address signal;

a random access memory into which data are to be written;

a mode selecting means which selects either a first mode or a second mode based on a mode selection signal received from a mode selection terminal to output an address selection control signal corresponding to the selected mode; and an address selecting means to which the input address signal and the translated address signal are supplied, wherein said address selecting means alternately provides the input address signal and the translated address signal as a write address signal and a read address signal, respectively, to the random access memory when receiving the address selection control signal corresponding to the first mode from the mode selecting means, and alternately provides the translated address signal and the input address signal as the write address signal and the read address signal, respectively, to the random access memory when receiving the address selection control signal corresponding to the second mode; wherein when receiving the address selection control signal conforming to the first mode from the mode selecting address signal to a specified decoder among the plurality of decoders in a writing stage and to one of the decoders other than the specified decoder in a reading stage, and when receiving the address selection control signal conforming to the second mode, a decoder selection circuit supplies the input address signal to the one decoder in the writing stage and to the specified decoder in the reading stage;

a rule used by the specified decoder in a decoding stage is a rule for decoding the input address signal as it is; and a rule used by the one decoder in the decoding stage is a rule for executing the decoding according to a translated address signal associated with the input address signal.

2. A sequential type permutation apparatus as claimed in claim 1, wherein the rules used by the respective decoders other than the specified decoder in the decoding stage are rules for executing the decoding according to mutually different translated address signals each associated with the input address signal, and the decoder selection circuit is provided with a decoder selecting means for selecting the one decoder based on a selection signal from a translation rule selection terminal to supply the input address signal thereto.

3. A sequential type permutation apparatus comprising:

an address generating means which generates an input address signal;

an address translation table memory which stores therein a translation table used for obtaining a translated address from the input address and which operates, upon receiving the input address signal, to output a translated address signal corresponding to the input address signal;

a dual port memory which has write port and a read port and into which data are to be written;

an address selecting means to which the input address signal and the translated address signal are supplied, wherein said address selecting means provides the dual port memory with the input address signal and the translated address as a write address signal and a read address signal, respectively, when receiving an address selection control signal representing a first mode from a mode selection terminal, and provides the dual port memory with the translated address signal and the input address signal as the write address signal and the read address signal, respectively, when receiving the address selection control signal representing a second mode from the mode selection terminal;

wherein

N-piece data sets are successively inputted to the write port of the dual port memory, and if an input order and an output order for the N-piece data in one set are i and fi, respectively, and a maximum value of |fi−i| with respect to all translation rules is Dmax, then the dual port memory has a storage capacity of (N+Dmax) pieces of data or more.

4. A sequential type permutation apparatus as claimed in claim 3, further comprising:

an address setting means which sets a next write address and a next read address but one for the dual port memory based on an address signal for designating an address next to a last address in a preceding writing area of the dual port memory and the write address signal and read address signal received from the address selecting means.

5. A sequential type permutation apparatus comprising:

an address generating means which generates an input address signal;

an address translation table memory which stores therein a translation table used for obtaining a translated address from an input address and which operates, upon receiving the input address signal, to output a translated address signal corresponding to the input address signal;

a dual port memory which has write port and a read port and into which data are to be written;

an address selecting means to which the input address signal and the translated address signal are supplied, wherein said address selecting means provides the dual port memory with the input address signal and the translated address as a write address signal and a read address signal, respectively, when receiving an address selection control signal representing a first mode from a mode selection terminal, and provides the dual port memory with the translated address signal and the input address signal as the write address signal and the read address signal, respectively, when receiving the address selection control signal representing a second mode from the mode selection terminal;

wherein 2m-piece data sets are successively inputted to the write port of the dual port memory, and if an input order and an output order for the 2m-piece data in one set are i and fi, respectively, a maximum value of |fi and i| with respect to all translation rules is Dmax, and m≧Dmax, then the dual port memory has a storage capacity of 3m pieces of data.

6. A sequential type permutation apparatus as claimed in claim 5, wherein the dual port memory is segmented into three writing areas each having a storage capacity of m pieces of data, said apparatus further comprising:

an address setting means which sets a next write address and a next read address but one for the dual port memory based on an area designation signal for designating a next writing area of the dual port memory and the write address signal and read address signal received from the address selecting means.

7. A sequential type permutation apparatus comprising:

an address generating means which generates an input address signal;

an address translation table memory which stores therein a translation table used for obtaining a translated address from an input address and which operates, upon receiving the input address signal, to output a translated address signal corresponding to the input address signal;

a dual port memory which has write port and a read port and into which data are to be written;

an address selecting means to which the input address signal and the translated address signal are supplied, wherein said address selecting means provides the dual port memory with the input address signal and the translated address as a write address signal and a read address signal, respectively, when receiving an address selection control signal representing a first mode from a mode selection terminal, and provides the dual port memory with the translated address signal and the input address signal as the write address signal and the read address signal, respectively, when receiving the address selection control signal representing a second mode from the mode selection terminal;

wherein $2^n$-piece data sets are successively inputted to the write port of the dual port memory, and if an input order and an output order for the $2^n$-piece data in one set are i and fi, respectively, a maximum value of $|fi-i|$ with respect to all translation rules is Dmax, and $2^{(n-1)} \geq$ Dmax, then the dual port memory has a storage capacity of $3\{2^{(n-1)}\}$ pieces of data.

8. A sequential type permutation apparatus as claimed in claim 7, wherein the dual port memory is segmented into three writing areas each having a storage capacity of $2^{(n-1)}$ pieces of data, and said apparatus further comprising:

an address setting means which sets a next write address and a next read address but one for the dual port memory based on an area designation signal for designating a next writing area of the dual port memory and the write address signal and read address signal received from the address selecting means.

* * * * *